United States Patent
Luttwak et al.

(10) Patent No.: US 12,491,008 B2
(45) Date of Patent: Dec. 9, 2025

(54) PHALANX FRACTURE REDUCTION

(71) Applicant: RAMBAM MEDTECH LTD., Haifa (IL)

(72) Inventors: Ruth Luttwak, Haifa (IL); Ophir Marko, Watchung, NJ (US)

(73) Assignee: RAMBAM MEDTECH LTD., Haifa (IL)

( * ) Notice: Subject to any disclaimer, the term of this patent is extended or adjusted under 35 U.S.C. 154(b) by 0 days.

(21) Appl. No.: 18/840,992

(22) PCT Filed: Feb. 23, 2023

(86) PCT No.: PCT/IL2023/050188
§ 371 (c)(1),
(2) Date: Aug. 23, 2024

(87) PCT Pub. No.: WO2023/161930
PCT Pub. Date: Aug. 31, 2023

(65) Prior Publication Data
US 2025/0169857 A1  May 29, 2025

Related U.S. Application Data

(63) Continuation-in-part of application No. 17/652,424, filed on Feb. 24, 2022, now Pat. No. 11,666,361.

(51) Int. Cl.
*A61B 17/64* (2006.01)
*A61B 17/56* (2006.01)
(Continued)

(52) U.S. Cl.
CPC .......... *A61B 17/6425* (2013.01); *A61B 17/62* (2013.01); *A61B 17/848* (2013.01); *A61B 17/1697* (2013.01); *A61B 2017/564* (2013.01)

(58) Field of Classification Search
CPC .............................. A61B 17/62; A61B 17/848
(Continued)

(56) References Cited

U.S. PATENT DOCUMENTS

| 4,978,348 A | 12/1990 | Ilizarov |
| 5,067,954 A | 11/1991 | Ilizarov |

(Continued)

FOREIGN PATENT DOCUMENTS

CN  102836002 A  12/2012

OTHER PUBLICATIONS

International Search Report (PCT/ISA/210) dated Apr. 24, 2023 issued by the International Searching Authority in International Application No. PCT/IL2023/050188 (Copy previously provided).

(Continued)

*Primary Examiner* — Eduardo C Robert
*Assistant Examiner* — Tara Rose E Carter
(74) *Attorney, Agent, or Firm* — Sughrue Mion, PLLC

(57) ABSTRACT

A guide device is provided for fixation of a fractured phalange. The guide device includes a proximal part, which is shaped so as to define therethrough an aperture, and which includes a first cushion within the aperture, which is configured to hold the fractured phalange in place. A distal part is shaped so as to define an opening at a proximal end of the distal part and a tubular section. The distal part includes a second cushion within the tubular section, configured to hold a portion of the fractured phalange in place. A pin guide is connected to and extends distally from the distal part, and is shaped so as to define an elongate guide passage therethrough that is configured to align the k-wire with the portion of the fractured phalange during insertion of a k-wire into the portion of the fractured phalange. Other embodiments are also described.

20 Claims, 20 Drawing Sheets

(51) Int. Cl.
 *A61B 17/62* (2006.01)
 *A61B 17/84* (2006.01)
 *A61B 17/16* (2006.01)

(58) Field of Classification Search
 USPC .................................................... 606/53–59
 See application file for complete search history.

(56) References Cited

U.S. PATENT DOCUMENTS

| | | |
|---|---|---|
| 5,098,383 A | 3/1992 | Hemmy et al. |
| 8,317,690 B2 | 11/2012 | Ransden et al. |
| 10,349,981 B2 | 7/2019 | Burgherr et al. |
| 2012/0203061 A1 | 8/2012 | Birk |
| 2014/0277450 A1 | 9/2014 | Warburton |
| 2016/0074049 A1 | 3/2016 | Russell et al. |
| 2016/0081727 A1 | 3/2016 | Munday et al. |
| 2016/0192975 A1 | 7/2016 | Winnen |
| 2016/0235461 A1 | 8/2016 | Sumko |
| 2017/0100273 A1 | 4/2017 | McCormick et al. |
| 2021/0128136 A1 | 5/2021 | Harari |

OTHER PUBLICATIONS

Communication dated Nov. 29, 2022 issued by the United States Patent and Trademark Office in U.S. Appl. No. 17/652,424.

PHALANX FRACTURE REDUCTION

CROSS-REFERENCE TO RELATED APPLICATIONS

The present patent application is the US national stage of International Application PCT/IL2023/050188, filed Feb. 23, 2023, which claims priority from and is a continuation-in-part of U.S. application Ser. No. 17/652,424, filed Feb. 24, 2022, now U.S. Pat. No. 11,666,361, which is assigned to the assignee of the present application and incorporated herein by reference.

FIELD OF THE INVENTION

The present disclosure relates generally to orthopedic surgical devices and specifically to fracture reduction through the distal phalanx.

BACKGROUND OF THE INVENTION

Distal phalanx fractures are the most common type of fracture in the hand. When such a fracture occurs, a typical approach is to insert a Kirschner wire (also known as a k-wire) through the distal phalange in order to perform fixation of the bone. The k-wires, or pins, are sterilized, smooth stainless steel pins, and are widely used in reduction and fixations of fractures.

The distal phalange has a rounded tip, resulting in a risk of slippage of the k-wire, when inserted through the fingertip. Slippage can occur in the dorsal, lateral, or palmar direction, and is obviously unwanted, as it may injure surrounding tissue, and not achieve the purpose of the insertion, which is to fixate the bone in place.

In their surgical reference for k-wire Fixation, Fiesky N., Fricker R., Kastelec M., et al. recommend that a 16 gauge hypodermic needle, or a 1 mm drill guide be used to ensure proper insertion in order to prevent slippage (Fiesky N., Fricker R., Kastelec M., et al., "K-wire fixation," in AO Surgical Reference, Colton C., Ed., First Edition (2008)). However, Fiesky et al. recognize that at least one problem of this technique is that the k-wire may be inserted at an angle to the axis of the phalanx. This is likewise undesirable as it does not solve the problem of fixation, and if removed before a second k-wire is inserted, the second k-wire may slip and be placed along the wrong track.

SUMMARY OF THE INVENTION

Certain embodiments of the present invention disclosed herein include a method for performing k-wire fixation in a phalange. The method comprises: inserting a phalange into a first proximal part, the first proximal guide comprising an aperture through which to insert the phalange, and a plurality of fasteners; inserting the phalange into a distal part, the distal part comprising: a tubular section into which at least a portion of a distal phalanx of the phalange is inserted, and a pin guide; and inserting a k-wire through the pin guide and into the phalange.

Certain embodiments of the present invention disclosed herein also include a guide device for an orthopedic surgery on a phalange, comprising: a distal part, having a first opening of a first diameter at a proximal end for inserting at least a portion of a phalange into a tubular section of the distal part, and a second opening at a distal end; and a pin guide connected to the distal end, the pin guide having a first length which is shorter than a length of a k-wire inserted into the phalange, and a second diameter which is greater than a diameter of the k-wire, and less than the first diameter.

In some embodiments of the present invention disclosed herein the guide device further comprises a proximal part, the proximal part comprising: an aperture for inserting a phalange; and a plurality of fasteners, for fastening the proximal part to the distal part.

There is therefore provided, in accordance with an Inventive Concept 1 of the present invention, a guide device for fixation of a fractured phalange by insertion of a k-wire having a diameter, the guide device including:

a distal part, shaped so as to define a first opening of a first diameter at a proximal end of the distal part for inserting at least a portion of the fractured phalange into a tubular section of the distal part, and a second opening at a distal end of the distal part; and a pin guide fixedly connected to the distal end of the distal part, the pin guide having a second diameter which is greater than the diameter of the k-wire, and less than the first diameter, wherein the pin guide is shaped so as to define an elongate cylindrical guide passage therethrough that is configured to align the k-wire with the portion of the fractured phalange during the insertion of the k-wire into the portion of the fractured phalange while the portion of the fractured phalange is held in place within the tubular section of the distal part.

Inventive Concept 2. The guide device according to Inventive Concept 1, wherein the pin guide is concentric to the tubular section.

Inventive Concept 3. The guide device according to Inventive Concept 1, wherein a diameter of the elongate cylindrical guide passage is 1-2 mm.

Inventive Concept 4. The guide device according to Inventive Concept 3, wherein the diameter of the elongate cylindrical guide passage is 1.4-1.8 mm.

Inventive Concept 5. The guide device according to Inventive Concept 1, wherein a length of the elongate cylindrical guide passage is at least 5 mm.

Inventive Concept 6. The guide device according to Inventive Concept 5, wherein the length of the elongate cylindrical guide passage is at least 7 mm.

Inventive Concept 7. The guide device according to Inventive Concept 1, wherein a diameter of the pin guide is 1 millimeter, with a 5% threshold.

Inventive Concept 8. The guide device according to Inventive Concept 1, wherein the distal part has a length between 1 centimeter and seven centimeters.

Inventive Concept 9. The guide device according to any one of Inventive Concepts 1-8, further including a proximal part, the proximal part shaped so as to define an aperture for inserting the fractured phalange, and the proximal part including a plurality of fasteners, for fastening the proximal part to the distal part.

Inventive Concept 10. The guide device according to Inventive Concept 9, further including:

at least a cushion, wherein the at least a cushion is located in any one of: the tubular section of the distal part, and the aperture.

Inventive Concept 11. The guide device according to Inventive Concept 10, wherein the at least a cushion is selected from the group consisting of: a sponge cushion, and an inflatable cushion.

Inventive Concept 12. The guide device according to Inventive Concept 11, wherein the at least a cushion includes the inflatable cushion, and wherein the distal part or the proximal part is shaped so as to define a duct through which the inflatable cushion is inflatable.

Inventive Concept 13. The guide device according to Inventive Concept 12, wherein the at least a portion of the inflatable cushion includes a connector for connecting to a pressure supply device.

Inventive Concept 14. The guide device according to Inventive Concept 9, further including:
  a plurality of rods, each rod coupled to a fastener of the plurality of fasteners.

Inventive Concept 15. The guide device according to Inventive Concept 14, wherein any one of: the proximal part, the distal part, and the plurality of rods includes a thermoplastic material with carbon fiber reinforcement.

Inventive Concept 16. The guide device according to Inventive Concept 9, wherein the plurality of fasteners further include at least an anchor point, the at least an anchor point including a threaded hole.

Inventive Concept 17. The guide device according to Inventive Concept 9, including a plurality of pin guides including the pin guide that is fixedly connected to the distal end of the distal part.

Inventive Concept 18. The guide device according to Inventive Concept 17, for use with first and second k-wires, wherein at least a first pin guide of the plurality of pin guides is at an angle relative to at least another pin guide of the plurality of pin guides, such that the first pin guide orients the first k-wire, when inserted through the first pin guide, in a direction not parallel to a direction that the at least another pin guide orients the second k-wire, when inserted through the at least another pin guide.

Inventive Concept 19. The guide device according to any one of Inventive Concepts 1-8,
  wherein the k-wire is a first k-wire, and wherein the guide device is for use with the first k-wire and a second k-wire, and
  wherein an element of the guide device is shaped as to define at least a channel, configured for inserting therethrough the second k-wire to guide the second k-wire into the fractured phalange by a lateral approach, the element selected from the group of elements consisting of: the proximal part and the distal part.

Inventive Concept 20. The guide device according to Inventive Concept 19, for use with the first k-wire, the second k-wire, and a third k-wire,
  wherein the channel is a first channel and the lateral approach is a first lateral approach, and
  wherein the selected element of the guide device is shaped so as to define at least a second channel, configured for inserting therethrough the third k-wire into the fractured phalange by a second lateral approach oriented with respect to the fractured phalange differently from an orientation of the first lateral approach.

Inventive Concept 21. The guide device according to any one of Inventive Concepts 1-8,
  wherein the pin guide is a first pin guide and the elongate cylindrical guide passage is a first elongate cylindrical guide passage, and
  wherein the guide device further includes:
    a proximal guide, which is separate from and coupled to the distal part; and
    a second pin guide fixedly connected to the proximal guide, the second pin guide shaped so as to define a second elongate cylindrical guide passage therethrough that is configured to align the k-wire with the fractured phalange during the insertion of the k-wire into the portion of the fractured phalange while the portion of the fractured phalange is held in place within the tubular section of the distal part.

Inventive Concept 22. The guide device according to Inventive Concept 21, wherein the proximal guide is shaped so as to define a partial ring.

Inventive Concept 23. The guide device according to Inventive Concept 21, wherein the proximal guide is shaped so as to define an indent.

Inventive Concept 24. The guide device according to Inventive Concept 21,
  further including a proximal part, the proximal part shaped so as to define an aperture for inserting the fractured phalange, and the proximal part including a plurality of fasteners, for fastening the proximal part to the distal part and to the proximal guide,
  wherein the proximal guide is disposed proximal to the proximal part, and
  wherein the proximal part is separate from and coupled to the distal part and to the proximal guide.

Inventive Concept 25. A kit including the guide device according to any one of Inventive Concepts 1-8, the kit further including the k-wire.

There is further provided, in accordance with an Inventive Concept 26 of the present invention, a method for performing k-wire fixation of a fractured phalange, the method including:
  inserting at least a portion of the fractured phalange into a tubular section of a distal part of a guide device via a first opening at a proximal end of the distal part, the distal part including a pin guide fixedly connected to a distal end of the distal part; and
  fixating the fractured phalange by inserting a k-wire through an elongate cylindrical guide passage of the pin guide and into the fractured phalange, while the elongate cylindrical guide passage aligns the k-wire with the at least a portion of the fractured phalange held in place within the tubular section of the distal part.

Inventive Concept 27. The method according to Inventive Concept 26, further including, before inserting the at least a portion of the fractured phalange into the tubular section of the distal part, inserting the fractured phalange into an aperture of a proximal part of the guide device.

Inventive Concept 28. The method according to Inventive Concept 27, further including:
  aligning the fractured phalange in the proximal part and the distal part using pressure.

Inventive Concept 29. The method according to Inventive Concept 28, wherein aligning the proximal and the distal parts using the pressure includes generating the pressure using any of: an inflatable cushion, a sponge cushion, and a combination thereof.

Inventive Concept 30. The method according to Inventive Concept 27, further including:
  coupling the proximal part to the distal part using a plurality of rods.

Inventive Concept 31. The method according to Inventive Concept 26, further including removing the guide device from the fractured phalange within 5 minutes after fixating the fractured phalange by inserting the k-wire.

Inventive Concept 32. The method according to Inventive Concept 26, wherein fixating the fractured phalange by inserting the k-wire into the fractured phalange includes fixating the fractured phalange by inserting the k-wire into the fractured phalange without first drilling into the fractured phalange using a drill bit separate from the k-wire.

Inventive Concept 33. The method according to Inventive Concept 26, wherein fixating the fractured phalange does not include inserting into the fractured phalange an intramedullary device other than the k-wire.

There is still further provided, in accordance with an Inventive Concept 34 of the present invention, a guide device for an orthopedic surgery on a phalange, including:
- a distal part, having a first opening of a first diameter at a proximal end for inserting at least a portion of a phalange into a tubular section of the distal part, and a second opening at a distal end; and
- a pin guide connected to the distal end, the pin guide having a first length which is shorter than a length of a k-wire inserted into the phalange, and a second diameter which is greater than a diameter of the k-wire, and less than the first diameter.

Inventive Concept 35. The guide device according to Inventive Concept 34, wherein the pin guide is concentric to the tubular section.

Inventive Concept 36. The guide device according to Inventive Concept 34, wherein a diameter of the pin guide is 1 millimeter, with a 5% threshold.

Inventive Concept 37. The guide device according to Inventive Concept 34, wherein the distal part has a length between 1 centimeter and seven centimeters.

Inventive Concept 38. The guide device according to any one of Inventive Concepts 34-37, further including a proximal part, the proximal part including:
- an aperture for inserting a phalange; and
- a plurality of fasteners, for fastening the proximal part to the distal part.

Inventive Concept 39. The guide device according to Inventive Concept 38, further including:
- at least cushion, wherein the at least a cushion is located in any one of: the tubular section of the distal part, and the aperture.

Inventive Concept 40. The guide device according to Inventive Concept 39, wherein the at least a cushion is any one of: a sponge cushion, an inflatable cushion.

Inventive Concept 41. The guide device according to Inventive Concept 40, further including:
- a duct in any one of: the distal part, and the proximal part, wherein at least a portion of the inflatable cushion can pass through the duct.

Inventive Concept 42. The guide device according to Inventive Concept 41, wherein the at least a portion of the inflatable cushion includes a connector for connecting to a pressure supply device.

Inventive Concept 43. The guide device according to Inventive Concept 38, further including:
- a plurality of rods, each rod coupled to a fastener of the plurality of fasteners.

Inventive Concept 44. The guide device according to Inventive Concept 43, wherein any one of: the proximal part, the distal part, and the plurality of rods includes a thermoplastic material with carbon fiber reinforcement.

Inventive Concept 45. The guide device according to Inventive Concept 38, wherein the plurality of fasteners further include at least an anchor point, the at least an anchor point including a threaded hole.

Inventive Concept 46. The guide device according to Inventive Concept 38, further including:
- a plurality of pin guides.

Inventive Concept 47. The guide device according to Inventive Concept 46, wherein at least a first pin guide of the plurality of pin guides is at an angle relative to at least another pin guide of the plurality of pin guides, such that a first k-wire inserted through the first pin guide is not parallel to a second k-wire inserted through the at least another pin guide.

Inventive Concept 48. The guide device according to any one of Inventive Concepts 34-37, further including:
- at least one channel, for inserting therethrough at least another k-wire.

Inventive Concept 49. The guide device according to Inventive Concept 48, wherein the at least one channel is placed on any one of: the proximal part, and the distal part.

There is additionally provided, in accordance with an Inventive Concept 50 of the present invention, a method for performing k-wire fixation in a phalange, including:
- inserting a phalange into a first proximal part, the first proximal guide including:
  - an aperture through which to insert the phalange, and a plurality of fasteners;
- inserting the phalange into a distal part, the distal part including: a tubular section into which at least a portion of a distal phalanx of the phalange is inserted, and a pin guide; and
- inserting a k-wire through the pin guide and into the phalange.

Inventive Concept 51. The method according to Inventive Concept 50, further including:
- aligning the phalange in the first proximal part and the second proximal part using a pressure field.

Inventive Concept 52. The method according to Inventive Concept 51, wherein the pressure field is generated by any of: an inflatable cushion, a sponge cushion, and a combination thereof.

Inventive Concept 53. The method according to Inventive Concept 50, further including: coupling the first proximal part to the distal part using a plurality of rods.

The present invention will be more fully understood from the following detailed description of embodiments thereof, taken together with the drawings, in which:

DETAILED DESCRIPTION OF EMBODIMENTS

Figure 1:
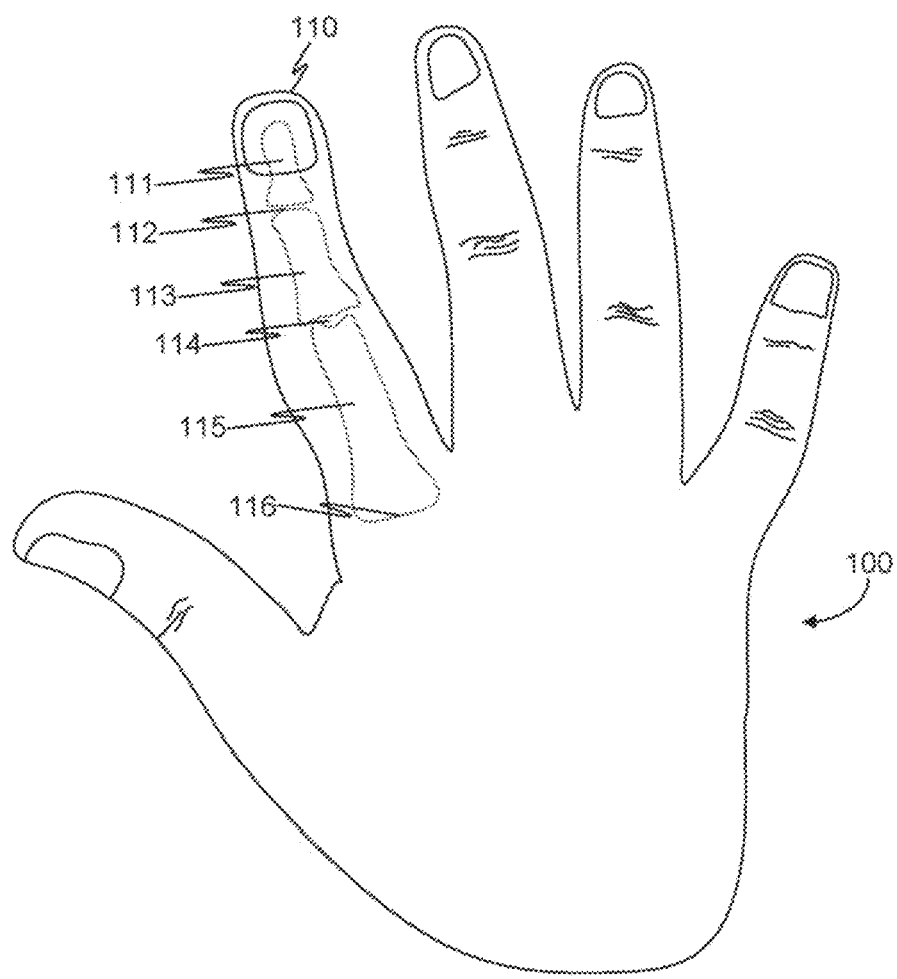
FIG. 1 is an exemplary diagram of a human right hand with a semi-transparent section corresponding to the index finger.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various example disclosed embodiments include an orthopedic guide for performing guided phalange fracture reduction and fixation with k-wire using an external guide device mounted on a fractured finger.

FIG. 1 is an exemplary diagram of a human right hand 100 with a semi-transparent section corresponding to the index finger 110. While the index finger 110 is shown, the teachings herein can be applied to any of the digits of either human hand, without departing from the scope of the present disclosure. The index finger 110, also referred to as a phalange or phalanx, includes three bone portions. The distal phalanx 111 is connected to the middle phalanx 113 at the distal inter-phalangeal (DIP) joint 112. The middle phalanx 113 is connected to the proximal phalanx 115 at the proximal interphalangeal (PIP) joint 114. The proximal phalanx 115 is connected to a metacarpal bone (not shown) at the metacarpophalangeal (MCP) joint 116.

Figure 2A:
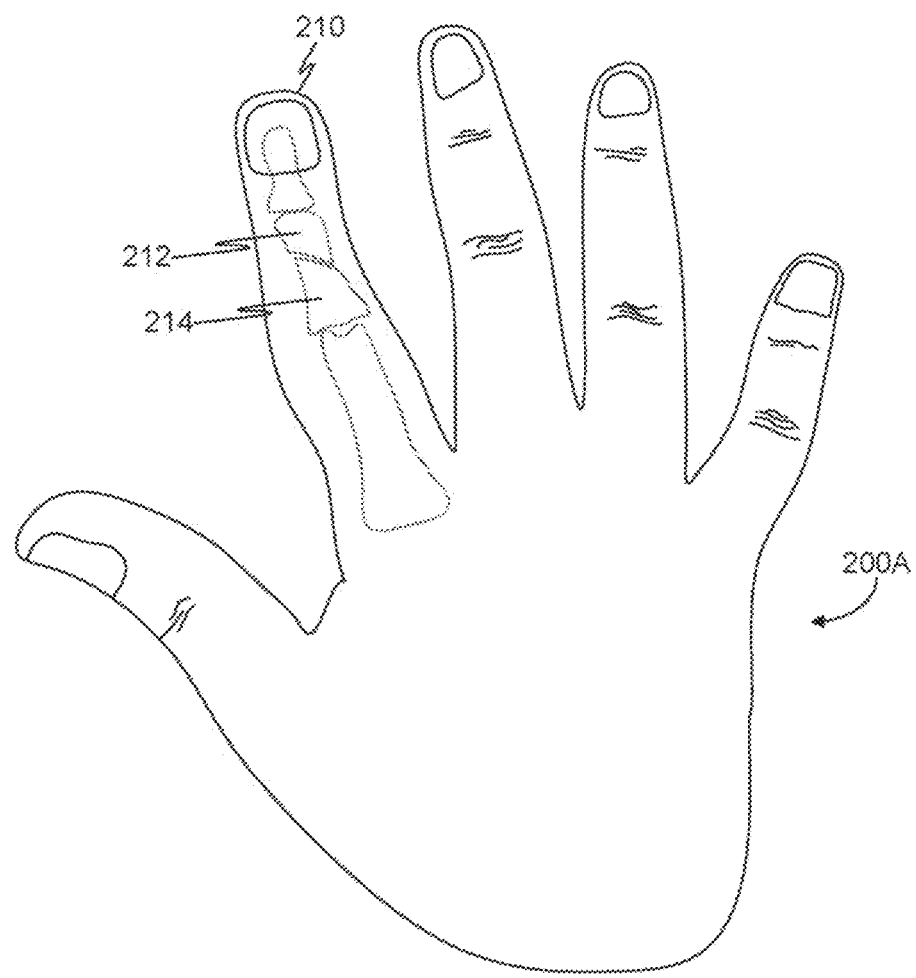
FIG. 2A is an exemplary diagram of a human right hand with a semi-transparent section corresponding to an index finger showing a middle phalanx fracture.

FIG. 2A is an exemplary diagram of a human right hand 200A with a semi-transparent section corresponding to an index finger 210 showing a middle phalanx fracture. A middle phalanx exhibits a transverse fracture, such that the middle phalanx is fractured into a first portion 212 and a second portion 214. In order to fix in place the first portion 212 and the second portion 214, a k-wire may be inserted through the distal tip of the index finger 210, through the distal phalanx 211, through the DIP joint, through the first portion 212 to the second portion 214, up to the PIP joint and even beyond to the MCP joint, in certain configurations.

Figure 2B:
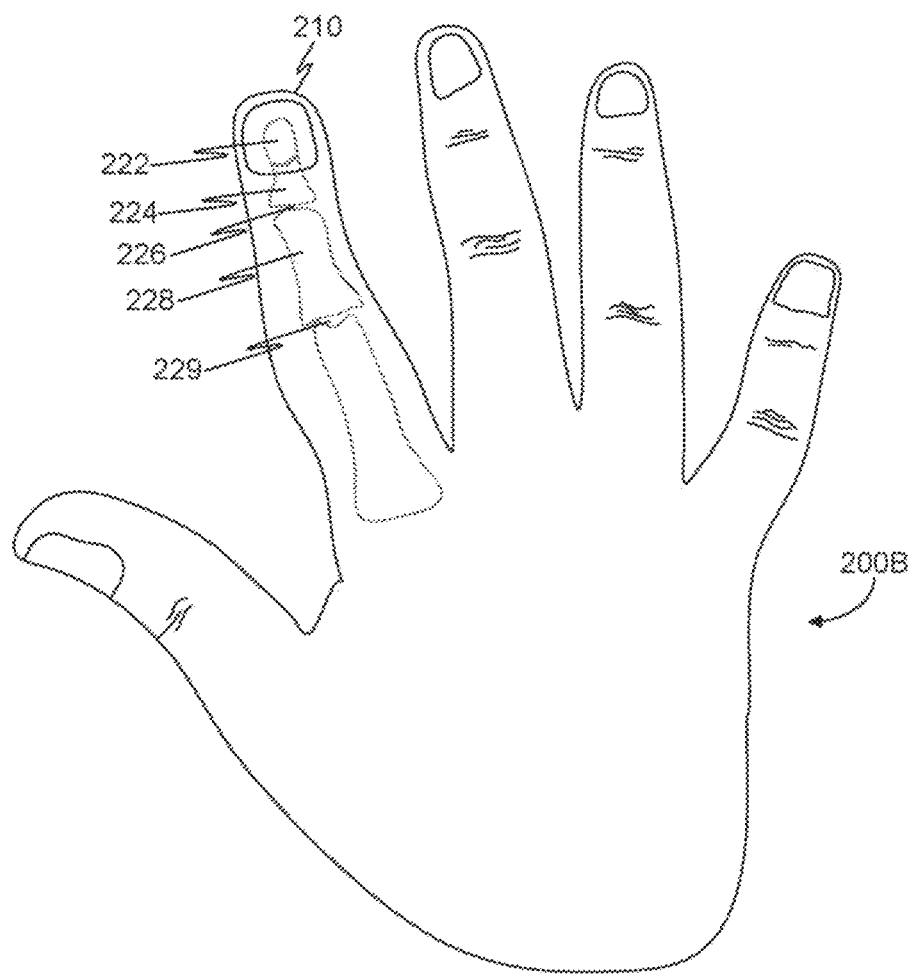
FIG. 2B is an exemplary diagram of a human right hand with a semi-transparent section corresponding to an index finger showing a distal phalanx fracture.

FIG. 2B is an exemplary diagram of a human right hand 200B with a semi-transparent section corresponding to an index finger 210 showing a distal phalanx fracture. A distal phalanx exhibits a transverse fracture into two portions, a first portion 222 closer to the fingertip, and a second portion 224 closer to the DIP joint 226. In order to fix in place the first portion 222 to the second portion 224, a k-wire may be inserted by dissecting the subcutaneous tissues at fingertip, horizontal to the distal phalanx. In certain configurations, for example when the fracture is proximal to the DIP joint 226, a k-wire may be further inserted through the DIP joint 226 into the middle phalanx 228 and up to the PIP joint 229. This may result in a more stable fixation, as the middle phalanx 228 provides additional support.

Figure 3:
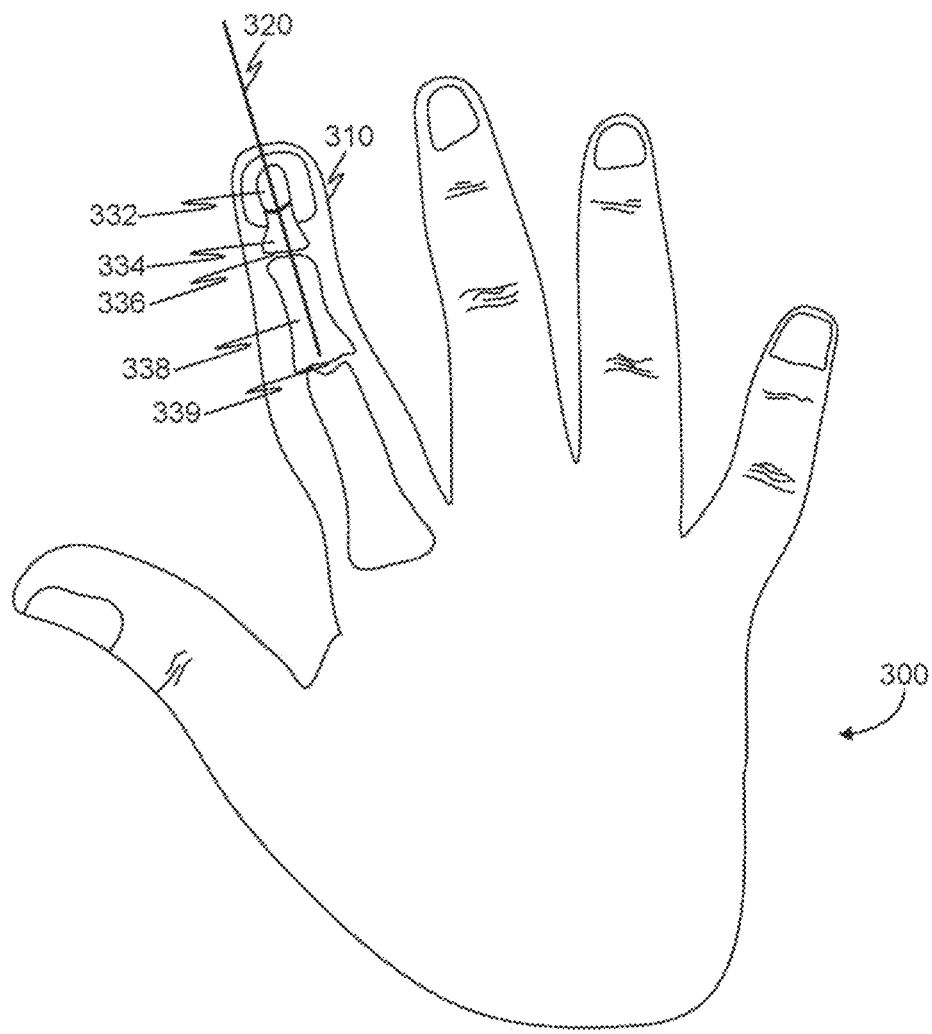
FIG. 3 is an exemplary diagram of a human right hand with a semi-transparent section corresponding to an index finger showing a distal phalanx fracture with a k-wire fixation.

FIG. 3 is an exemplary diagram of a human right hand 300 with a semi-transparent section corresponding to an index finger 310 showing a distal phalanx fracture with a k-wire fixation. A distal phalanx exhibits a transverse fracture into two portions, a first portion 332 closer to the fingertip, and a second portion 334 closer to the DIP joint 336. A k-wire 320 is inserted through the fingertip of the finger 310, through the first portion 332, the second portion 334, the DIP joint 336, and the middle phalanx 338, up to the PIP joint 339. Inserting the k-wire through the DIP joint 336 and into the middle phalanx 338 provides for an additional fixation in cases where the fracture is proximal to the DIP joint 336. Inserting the k-wire 320 properly through both bone fragments and the middle phalanx 338 is crucial for a successful recovery and repair. It is therefore important to be able to accurately guide the k-wire 320 when inserting, in order to remain centered across the anterior-posterior (AP) and lateral axes.

Figure 4:
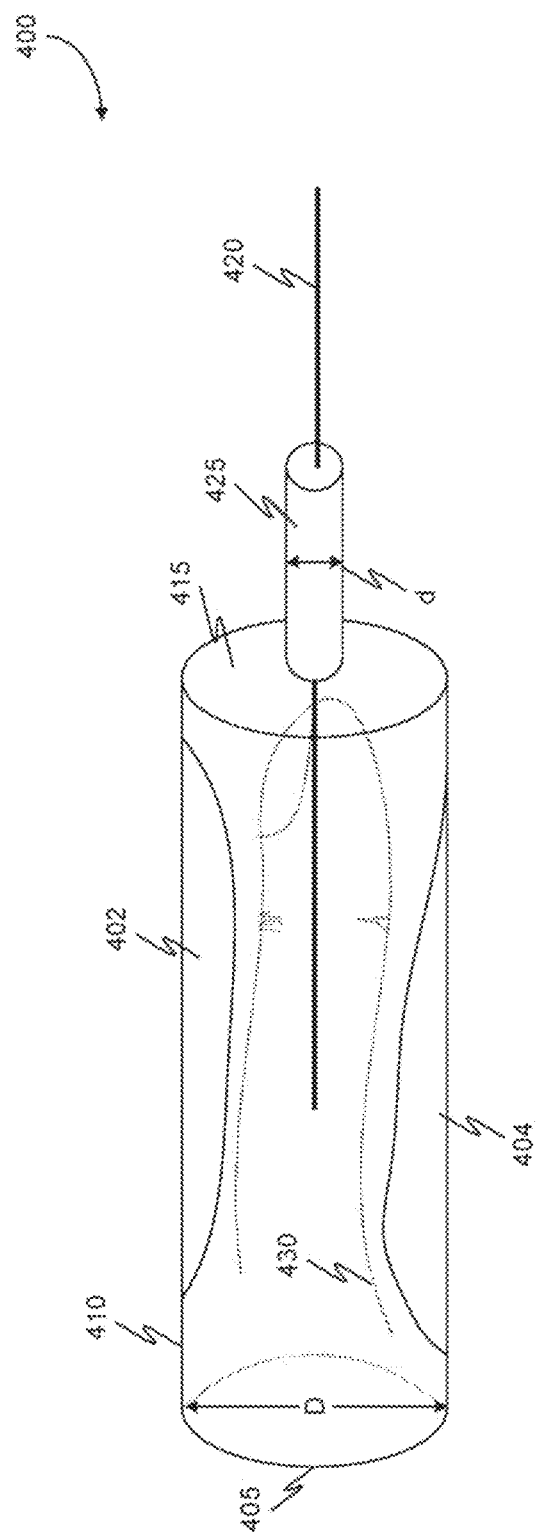
FIG. 4 is a schematic illustration of a k-wire guide device, in accordance with an application of the present invention.

FIG. 4 is a schematic illustration 400 of a k-wire guide device 410, implemented in accordance with an application of the present invention. In a configuration, the k-wire guide device 410 may be substantially tubular, having a length and a diameter. The k-wire guide device 410 is shaped so as to define a proximal opening 405 through which a fractured phalange 430 may be inserted into an internal portion of the k-wire guide device 410.

In some configurations, the internal portion of the k-wire guide device 410 may include at least a pressurizing device, such as a first inflatable cushion 402 which is diametrically opposite to a second inflatable cushion 404. In certain configurations the internal portion may be tubular. In a configuration, the first inflatable cushion 402 and second inflatable cushion 404 are connected to each other, or to a single pressure supply (not shown in FIG. 4, but shown and labeled in FIG. 7B), in order to supply the same amount of pressure on the fractured phalange 430 which is placed inside the k-wire guide device 410. In certain configurations, a single inflatable device is present in the k-wire guide device 410, to create a uniform pressure field. Applying pressure on the fractured phalange 430 serves to both keep the phalange in place through a friction fit, and to center the phalange within the k-wire guide device 410, which has a first diameter D which is greater than the diameter of the inserted phalange 430. In some configurations, a sponge cushion may be used, such as a polyurethane foam. For example, a viscoelastic polyurethane foam may be used to hold a phalange in place.

The k-wire guide device 410 further includes at a distal end 415 a pin guide 425. In a configuration the pin guide 425 may be substantially tubular, having a length and a diameter. The pin guide 425 has a second diameter d which is smaller than the first diameter D at the proximal opening 405 of the k-wire guide device 410. In a configuration, the second diameter d is larger in size than the diameter of a k-wire 420, so that the k-wire can pass through the pin guide 425 into the fractured phalange 430. For example, the second diameter d of the pin guide 425 may be 1 mm, within a 5% threshold.

The pin guide 425 typically is fixedly connected to the distal end 415 of the k-wire guide device 410. The pin guide 425 is shaped so as to define an elongate cylindrical guide passage therethrough. The k-wire 420 may be inserted into the pin guide 425 via a distal opening of the elongate cylindrical guide passage. The elongate cylindrical guide passage of the pin guide 425 is configured to align the k-wire 420 with the portion of the fractured phalange 430 during the insertion of the k-wire 420 into the portion of the fractured phalange 430 while the portion of the fractured phalange 430 is held in place within the internal portion of the k-wire guide device 410, which may be tubular.

In a configuration, the guide device may have a length between 1 cm and 7 cm.

A length of k-wire should be longer than the length of the pin guide 425. In a configuration, the length of the k-wire may be longer than the length of the pin guide 425 combined with the length of the k-wire guide device 410.

In certain configurations, a plurality of pin guides, such as pin guide 425, may be implemented. In some configurations, at least a portion of the plurality of pin guides may further be implemented at an angle relative to a central pin guide, i.e., not parallel to the central pin guide.

Figure 5:
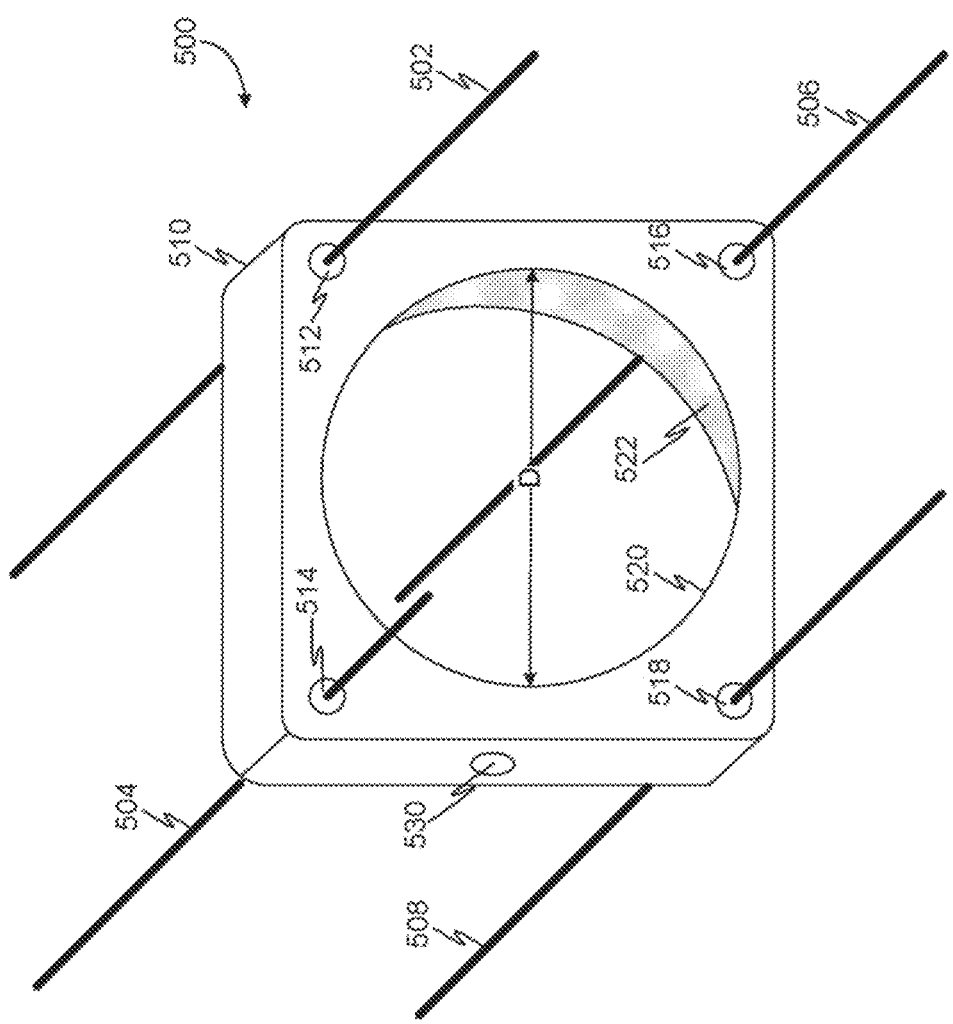
FIG. 5 is a schematic illustration of a proximal part of a multi-part k-wire guide device, in accordance with an application of the present invention.

FIG. 5 is a schematic illustration 500 of a proximal part 510 of a multi-part k-wire guide device, implemented in accordance with an application of the present invention. The multi-part k-wire guide device includes at least one proximal part 510, and a distal part, discussed in more detail with reference to FIG. 6 below. The proximal part 510 is typically separate from and coupled to the distal part, such as using one or more rods, as described hereinbelow. In certain configurations, a plurality of proximal parts may be utilized, for example in order to add stability to the fixation.

The proximal part 510 includes a plurality of perforations, such a first perforation 512, a second perforation 514, a third perforation 516 and a fourth perforation 518. In a configuration, the perforations may be threaded. Each perforation allows a stabilizing rod to pass through, such that a first rod 502 can pass through the first perforation 512, a second rod 504 can pass through the second perforation 514, a third rod 506 can pass through the third perforation 516, and a fourth rod 508 can pass through the fourth perforation 518. In certain configurations, the perforations may be smooth and the rods may be threaded. In such configurations, the rods may be held in place to the proximal part 510 by affixing with a nut (not shown).

In certain configurations, an anchor point can be utilized in place of a perforation. In certain configurations, a combination of anchor points and perforations may be used. For example, an anchor point may be a threaded hole in the proximal part 510, into which a partially (or fully) threaded rod may be screwed in. This reduces the need for an additional fastener. In configurations in which a plurality of proximal parts are utilized, a first proximal part closest to the palm of the hand may include a plurality of anchor points to each of which a rod is fastened, while a second proximal part may include perforations which guide the second proximal part along the rods fastened to the first proximal part. In such configurations, the diameter of the perforation of the second proximal part(s) may be larger than the diameter of the rods. Where a rod is fully threaded, the proximal part(s) may be held in place using, for example, nuts. The anchor points, rods, perforations, or a combination thereof, may be referred to generally throughout as a fastening system, which allows fastening a proximal part to at least a distal part.

The proximal part 510 is further shaped so as to define an aperture 520. In a configuration, the aperture 520 is centered with respect to the proximal part 510. The aperture 520 has a diameter D which is large enough to allow a fractured phalange 430 to be inserted into and extend through the aperture 520. The aperture 520 has an internal surface 522, to which an inflatable member (not shown in FIG. 5, but shown in and described hereinbelow with reference to FIGS. 7A-B), such as the inflatable cushion discussed above, may be affixed. A pressure supply 766 (not shown in FIG. 5, but shown and labeled in FIG. 7B) may be connected to the inflatable member through a duct 530 to supply and reduce pressure onto the fractured phalange 430 inserted in the aperture 520 as needed.

Figure 6:
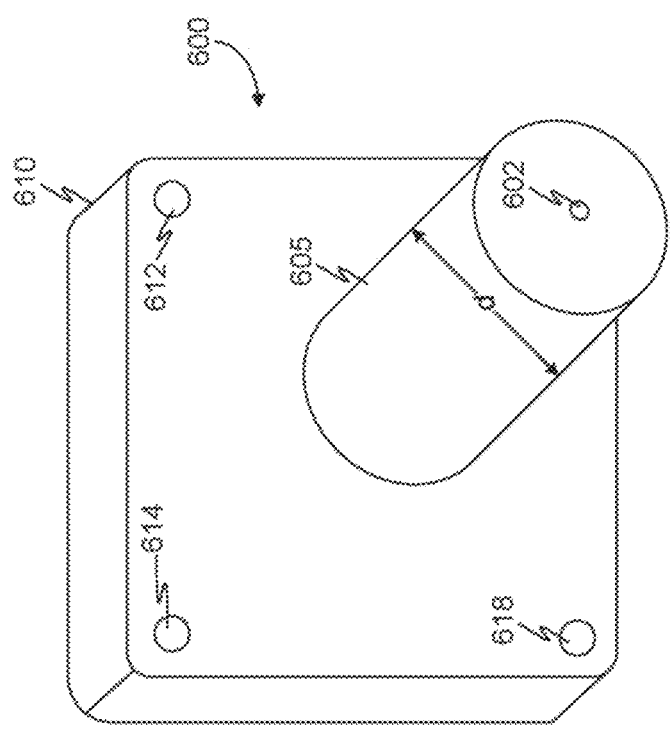
FIG. 6 is a schematic illustration of a distal part of a multi-part k-wire guide device, in accordance with an application of the present invention.

FIG. 6 is a schematic illustration 600 of a distal part 610 of a multi-part k-wire guide device, implemented in accordance with an application of the present invention. In some configurations, the multi-part k-wire guide device includes at least one proximal part, discussed in more detail with reference to FIG. 5 above, and the distal part 610. In these configurations, the distal part 610 is operative to be placed such that the proximal part is closer to the proximal part of an inserted fractured phalange 430 and the distal part 610 is placed at the distal end of the inserted fractured phalange 430 of the proximal part 510. Alternatively, in other configurations, the multi-part k-wire guide device does not include at least one proximal part.

The distal part 610 is shaped so as to define a first opening of a first diameter at a proximal end of the distal part 610 for inserting at least a portion of the fractured phalange 430 into a tubular section of the distal part 610, and a second opening at a distal end of the distal part 610. The first opening can be seen in distal part 810, illustrated in FIGS. 8A and 8B. The second opening is aligned with the pin guide 605, described hereinbelow. Optionally, the pin guide 605 is concentric to the tubular section of the distal part 610.

In some configurations, the distal part 610 is further shaped so as to define a plurality of perforations, such as a first perforation 612, a second perforation 614, a third perforation (obscured in FIG. 6) and a fourth perforation 618. In a configuration, the perforations may be threaded. Each perforation allows a stabilizing rod to pass through, such that the first rod 502 can pass through the first perforation 612, the second rod 504 can pass through the second perforation 614, the third rod 506 can pass through the third perforation, and the fourth rod 508 can pass through the fourth perforation 618, thereby coupling the proximal part to the distal part 610. In certain configurations, the perforations may be smooth and the rods may be threaded. In such configurations, the rods may be held in place to the distal part 610 by affixing with a nut (not shown).

The distal part 610 further includes a pin guide 605, which typically is fixedly connected to the distal end of the distal part 610. The pin guide 605 is shaped so as to define an elongate cylindrical guide passage therethrough. A k-wire may be inserted into the pin guide 605 via a distal opening 602 of the elongate cylindrical guide passage. The elongate cylindrical guide passage of the pin guide 605 is configured to align the k-wire with the portion of the fractured phalange 430 during the insertion of the k-wire into the portion of the fractured phalange 430 while the portion of the fractured phalange 430 is held in place within the tubular section of the distal part 610.

Typically, the elongate cylindrical guide passage of the pin guide 605 has a length of at least 3 mm (typically at least 5 mm), such as at least 7 mm, and/or no more than 30 mm, e.g., no more than 20 mm, or no more than 15 mm; for example, 7-15 mm, e.g., 9 mm. This length allows the elongate cylindrical guide passage of the pin guide 605 to align the k-wire with the portion of the fractured phalange 430, as described immediately above.

Typically, the elongate cylindrical guide passage of the pin guide 605 has a diameter of at least 1 mm, no more than 2 mm, and/or 1-2 mm, such as 1.4-1.8 mm, e.g., 1.6 mm. This diameter allows, the elongate cylindrical guide passage of the pin guide 605 to accept standard k-wires used for phalange fixation, which typically have diameters of 1-1.6 mm, for example 1.25 mm.

In certain configurations, the pin guide 605 may have a diameter d which is less than the diameter D of the aperture 520, but greater than a diameter of the opening 602. This may be useful to create a friction fit to the distal tip of the inserted fractured phalange 430. In some configurations, the diameter of the opening 602 may be equal to the diameter d of the pin guide 605. The diameter of the opening 602 may be, for example 1 mm with a tolerance of 5%. In a configuration, the distal part may have a length of 1 cm to 7 cm.

The above characteristics and dimensions of the pin guide 605 and/or the aperture 520 may also be implemented in any of the other pin guides and/or apertures described herein.

Figure 7A:
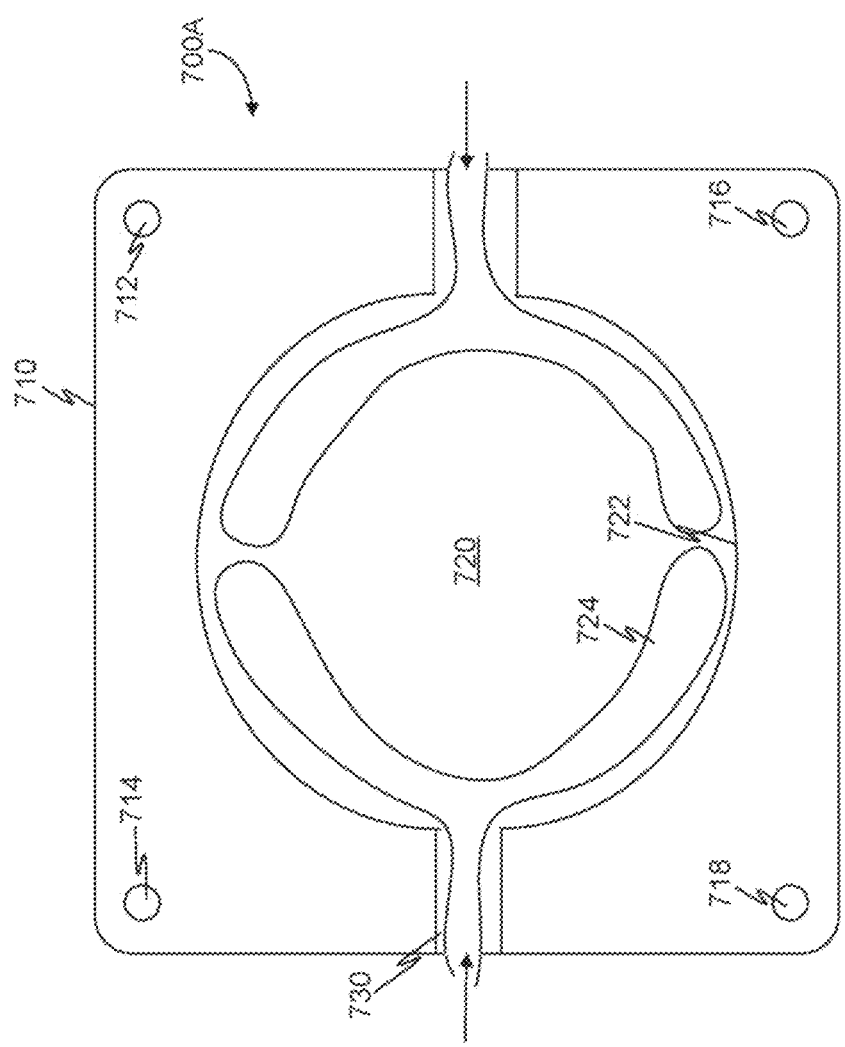
FIG. 7A is a schematic illustration of a cross-sectional view of a proximal part, implemented according to an application of the present invention.

FIG. 7A is a schematic illustration 700A of a cross-sectional view of a proximal part 710, implemented according to an application of the present invention. A proximal part 710 includes a plurality of perforations for affixing to support rods, for example as explained above. A first perforation 712, second perforation 714, third perforation 716 and fourth perforation 718 correspond respectively to the first perforation 512, second perforation 514, third perforation 516 and fourth perforation 518 of FIG. 5 above. The proximal part 710 further includes an aperture 720 which corresponds to the aperture 520 of FIG. 5. The aperture 720 has an internal surface 722, to which at least an inflatable member, such as an inflatable member 724 may be affixed. The inflatable member 724 is connected through a duct 730, corresponding to the duct 530 of FIG. 5, to a pressure supply (not shown in FIG. 7A, but shown and labeled in FIG. 7B), which can supply positive or negative pressure in order to inflate or deflate, respectively, the inflatable member 724. The inflatable member 724 may serve to both hold the fractured phalange 430 in place due to a friction fit, and also center the phalange 430 relative to the aperture 720, which in turn is centered to a pin guide, allowing the k-wire to pass through the distal phalanx.

Figure 7B:
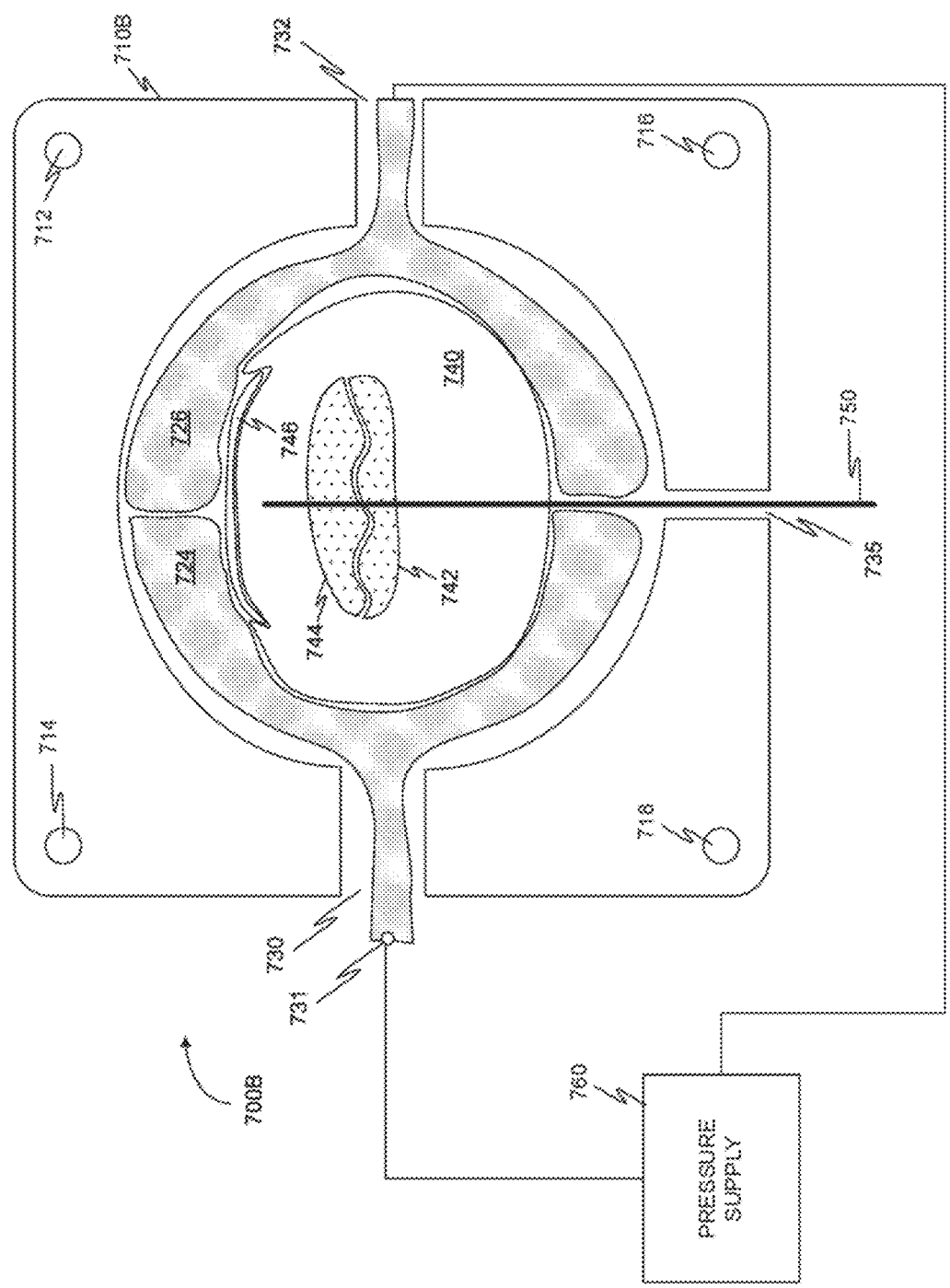
FIG. 7B is a schematic illustration of a cross-sectional view of a proximal part, implemented in accordance with another application of the present invention.

FIG. 7B is a schematic illustration 700B of a cross-sectional view of a proximal part, implemented in accordance with another application of the present invention. A fractured phalange 740 includes a middle phalanx exhibiting a lateral fracture, such that the middle phalanx is broken into a bottom fragment 742 and a top fragment 744. The fractured phalange 740 is inserted into the proximal part 710B. A first inflatable member 724 (e.g., comprising an inflatable cushion) is inserted so that a connector 731 of the first inflatable member 724 (e.g., comprising the inflatable cushion) is inserted through a duct 730, and connected to a pressure supply 760. The pressure supply 760 supplies pressure to the first inflatable member 724 (e.g., comprising the inflatable cushion) and a second inflatable member 726 (e.g., comprising an inflatable cushion), so that together the inflatable members (e.g., cushions) envelop the fractured phalange 740 and hold it in place. The second inflatable member 726 (e.g., comprising the inflatable cushion) is inserted into a second duct 732 to connect to the power supply.

The proximal part 710B may further include a channel 735, through which a k-wire may 750 be placed, to be inserted in the fractured phalange 740 through at least the bottom fragment 742 and the top fragment 744. In certain configurations, multiple channels may be implemented so that k-wires may be placed at different radial approaches (i.e. different radiant angles with respect to the fractured phalange 740).

In a configuration, the inflatable cushions may be removed from the proximal part 710B. Removal of the inflatable cushions allows to disinfect the proximal part 710B as it is exposed to a cleaning solution. For example, the proximal part may be submerged into an alcohol solution, or into an aqueous solution in a sonic bath. Alternatively, when applying heat in order to disinfect or sterilize, the ability to remove a cushion may likewise be advantageous. While discussion here is with respect to the proximal part 710B, it should be evident that the teachings may apply to any of the proximal parts, distal parts, or other guide devices disclosed herein.

In certain configuration, the proximal part, distal part, or other device part, may be implemented using a radiolucent material. A radiolucent material does not absorb x-ray radiation, as opposed to radiopaque materials, such as aluminum, stainless steel, and titanium, which absorb x-ray radiation and therefore obstruct visibility when performing x-ray based imaging. For example, a radiolucent material may be a thermoplastic resin, which is reinforced with carbon fibers. Polyether ether ketone (PEEK) is one such example of a thermoplastic polymer that may be further reinforced using bi-directional carbon fibers. This allows the radiolucent material to withstand use while retaining structural stability after multiple sterilization procedures.

Figure 8A:
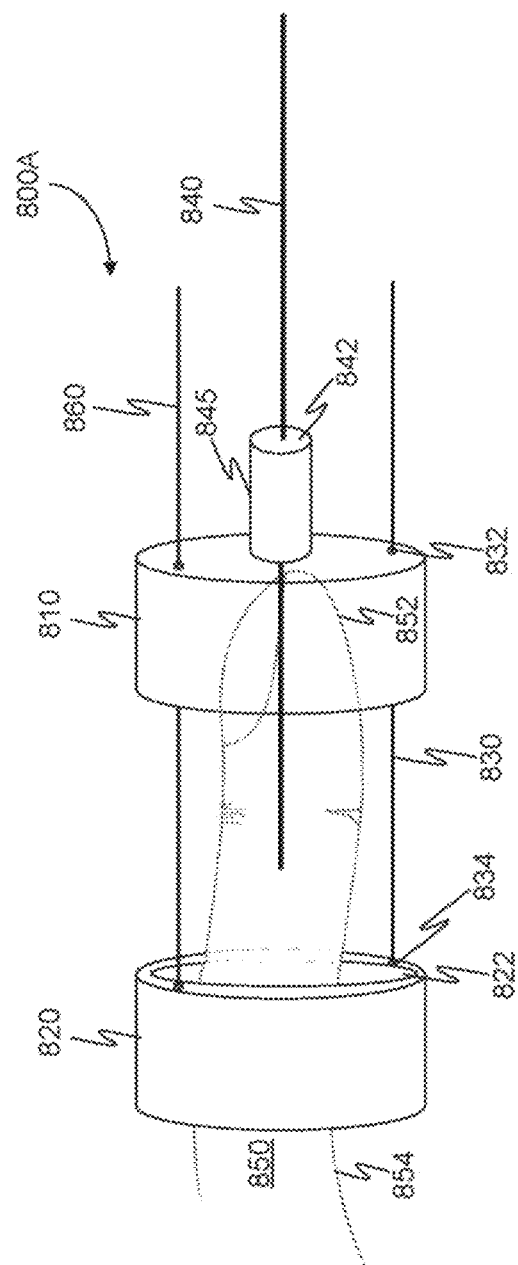
FIG. 8A is a schematic illustration of a side view of a multi-part k-wire guide device, in accordance with an application of the present invention.

FIG. 8A is a schematic illustration 800A of a side view of a multi-part k-wire guide device, implemented in accordance with an application of the present invention. The multi-part k-wire guide device includes a distal part 810 and, typically, at least a proximal part 820. In a configuration, a plurality of proximal parts may be used, spread across a fractured phalange 850. The proximal part 820 is placed such that the fractured phalange 850 extends through an aperture 822 of the proximal part 820. The proximal part 820 may reside at the middle phalanx, proximal phalanx, and both, for example when using a plurality of proximal parts. The proximal part includes a plurality of guide perforations, such as a first perforation 834.

The distal part 810 is placed at the distal phalanx 852. The distal part 810 includes a pin guide 845, which typically is fixedly connected to the distal end of the distal part 810. The pin guide 845 is shaped so as to define an elongate cylindrical guide passage therethrough. A k-wire 840 may be inserted into the pin guide 845 via a distal opening 842 of the elongate cylindrical guide passage. The elongate cylindrical guide passage of the pin guide 845 is configured to align the k-wire with the portion of the fractured phalange 850 during the insertion of the k-wire into the portion of the fractured phalange 850 while the portion of the fractured phalange 850 is held in place within the tubular section of the distal part 810.

The distal part 810 may further include a plurality of guide perforations, such as second perforation 832. The guide perforations are operative to receive through them a guiding rod. For example, guiding rod 830 is inserted through the first perforation 834 and the second perforation 832. In a configuration a guiding rod may be threaded, and held in place (i.e., affixed to the distal part and the proximal part) using nuts. A second guiding rod 860 is also used to affix the proximal part 820 and the distal part 810. The guiding rods 830 and 860 may be used to ensure that the proximal part 820 and the distal part 810 do not move relative to each other, and that the fractured phalange 850 is centered in the respective apertures therein.

Figure 8B:
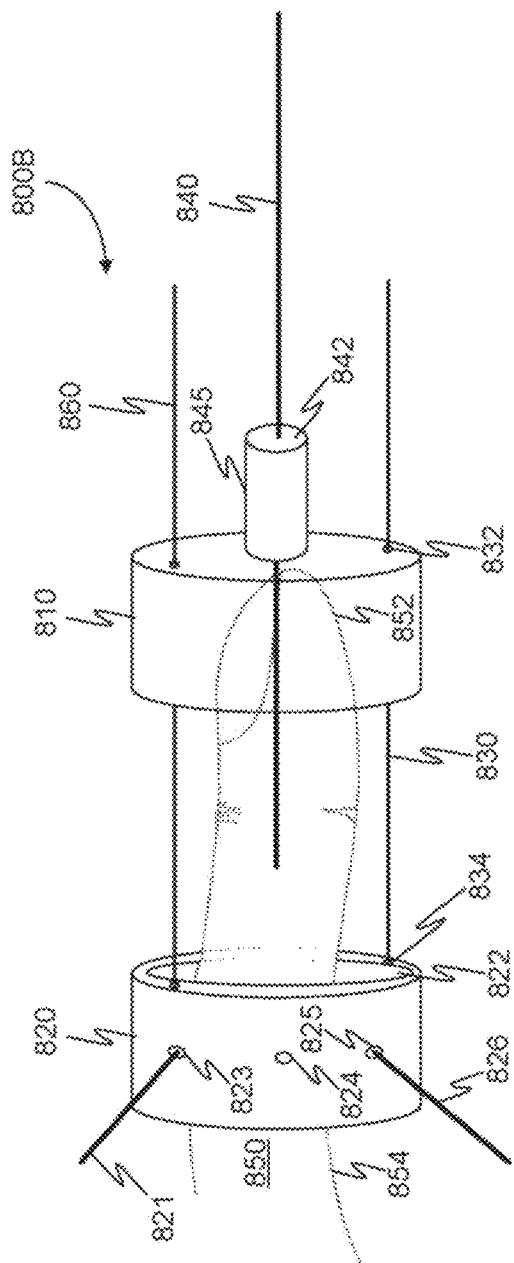
FIG. 8B is a schematic illustration of a side view of a multi-part k-wire guide device, implemented in accordance with another application of the present invention.

FIG. 8B is a schematic illustration 800B of a side view of a multi-part k-wire guide device, implemented in accordance with another application of the present invention. The proximal part 820 includes a plurality of channels, such as a first channel 823, a second channel 824 and a third channel 825. In a configuration, one or more k-wires may be inserted through each of one or more of the plurality of channels, to guide the one or more k-wires into the fractured phalange 850 by one or more respective lateral approaches. In some configurations at least a portion of the plurality of channels may have a diameter which allows the passage of a single k-wire. For example, the diameter may be as described hereinabove with reference to FIG. 6 for pin guide 605.

For example, a first k-wire 821 may be inserted into the fractured phalange 850 through the first channel 823. A second k-wire 826 may be inserted into the fractured phalange 850 through the third channel 825 by a lateral approach oriented with respect to the fractured phalange 850 differently from an orientation of the lateral approach taken for the first k-wire 821. In certain configurations, the distal part 810 may also be implemented with at least a channel (not shown) for inserting at least a k-wire therethrough.

The multi-part k-wire guide device of FIG. 8B may or may not comprise the pin guide 845. In configurations in which the multi-part k-wire guide device comprises the pin guide 845, the physician performing the method may or may not opt to insert a k-wire 840 using the pin guide 845; in the latter case, the physician uses the multi-part k-wire guide device only for inserted one or more k-wires by one or more respective lateral approaches.

In configurations in which a channel is implemented for inserting a k-wire, a foam based cushion may be used in place of an inflatable cushion. The foam based cushion may be a polyurethane polymer. A foam based cushion may hold a fractured phalange in place with less force than an inflatable cushion due to the difference in applied pressure, however a k-wire may pierce the foam based cushion without affecting performance, while a k-wire piercing an inflatable cushion would render the cushion inoperable in a deflated state.

Figure 8C:
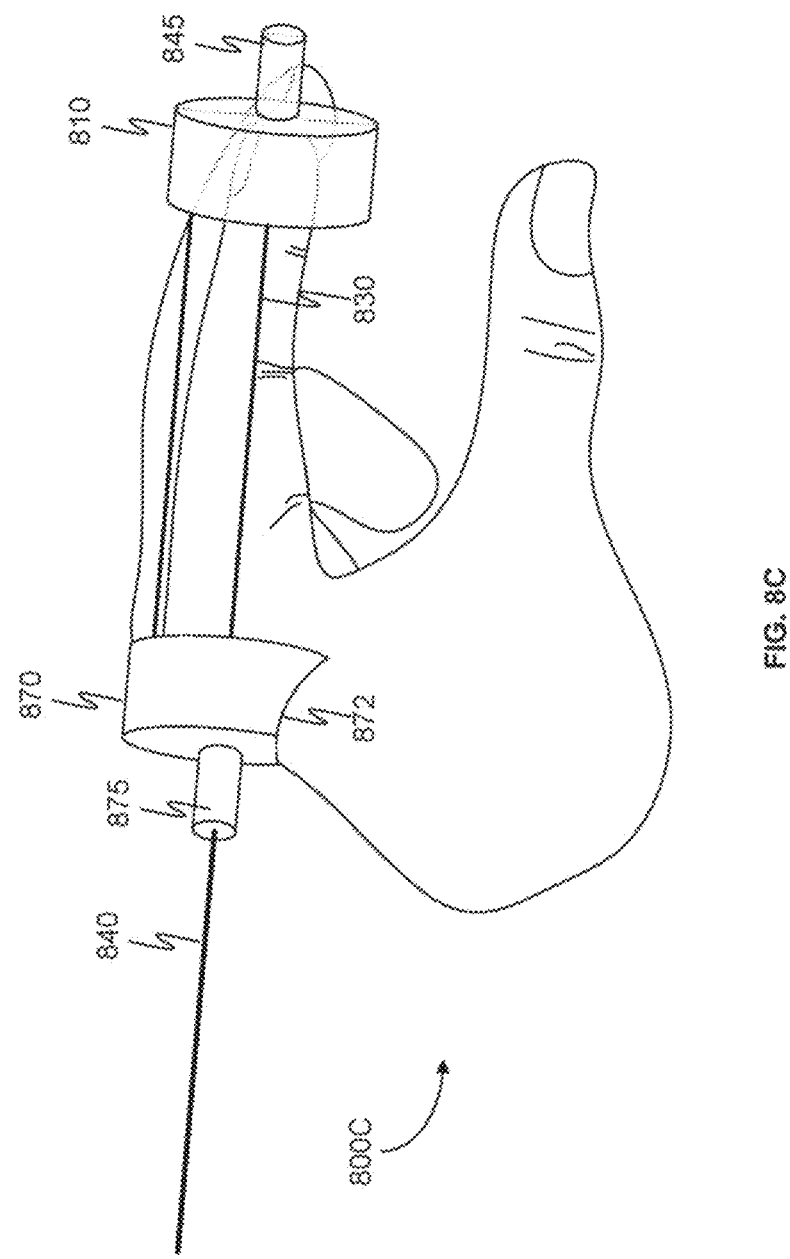
FIG. 8C is a schematic illustration of a side view of a multi-part k-wire guide device in a proximal fixation, in accordance with an application of the present invention.

FIG. 8C is a schematic illustration 800C of a side view of a multi-part k-wire guide device in a proximal fixation, implemented in accordance with yet another application of the present invention. This schematic illustration 800C shows a proximal fixation applied to the index finger of a left hand. In a configuration, a first distal part 810 comprises the pin guide 845. In some configurations, the first distal part 810 may be implemented without the pin guide 845. This may be beneficial in order to hold in place (i.e., stabilize) a proximal guide 870, which is placed in proximity of the MCP joint. The first distal part 810 may be affixed to one or more guiding rods, such as a first guiding rod 830.

The proximal guide 870 comprises a pin guide 875, which typically is fixedly connected to a proximal end of the proximal guide 870. The pin guide 605 is shaped so as to define an elongate cylindrical guide passage therethrough. In a configuration, one or more k-wires may be inserted through the pin guide 875 via a proximal opening of the elongate cylindrical guide passage. The elongate cylindrical guide passage of the pin guide 875 is configured to align the k-wire with the portion of the fractured phalange 850 during the insertion of the k-wire into the portion of the fractured phalange 850 while the portion of the fractured phalange 850 is held in place within the tubular section of the distal part 810 and the proximal guide 870 is placed in proximity of the MCP joint. The proximal guide 870 is typically separate from and coupled to the first distal part 810, such as using one or more rods, as described herein.

In certain configurations, the proximal guide 870 may include a plurality of pin guides. In some configurations, a pin guide is centered relative to the MCP joint. A k-wire 840 may be placed through the pin guide 875, and inserted through the MCP joint, and be further inserted at least into the proximal phalanx.

In certain configurations, the proximal guide 870 may include an indent 872 at a bottom portion (i.e., a portion which is closer to the wrist) in order to accommodate the structure of the MCP joint area. Alternatively or additionally, the proximal guide 870 may be shaped so as to define a partial ring. As with the distal guides described above, the proximal guide 870 may include a cushion in order to generate pressure on the fractured phalange and increase friction to prevent movement of the fractured phalange in the proximal guide. In some configurations, a distal guide such as described above can be utilized as a proximal guide 870 for performing a proximal fixation.

Figure 9:
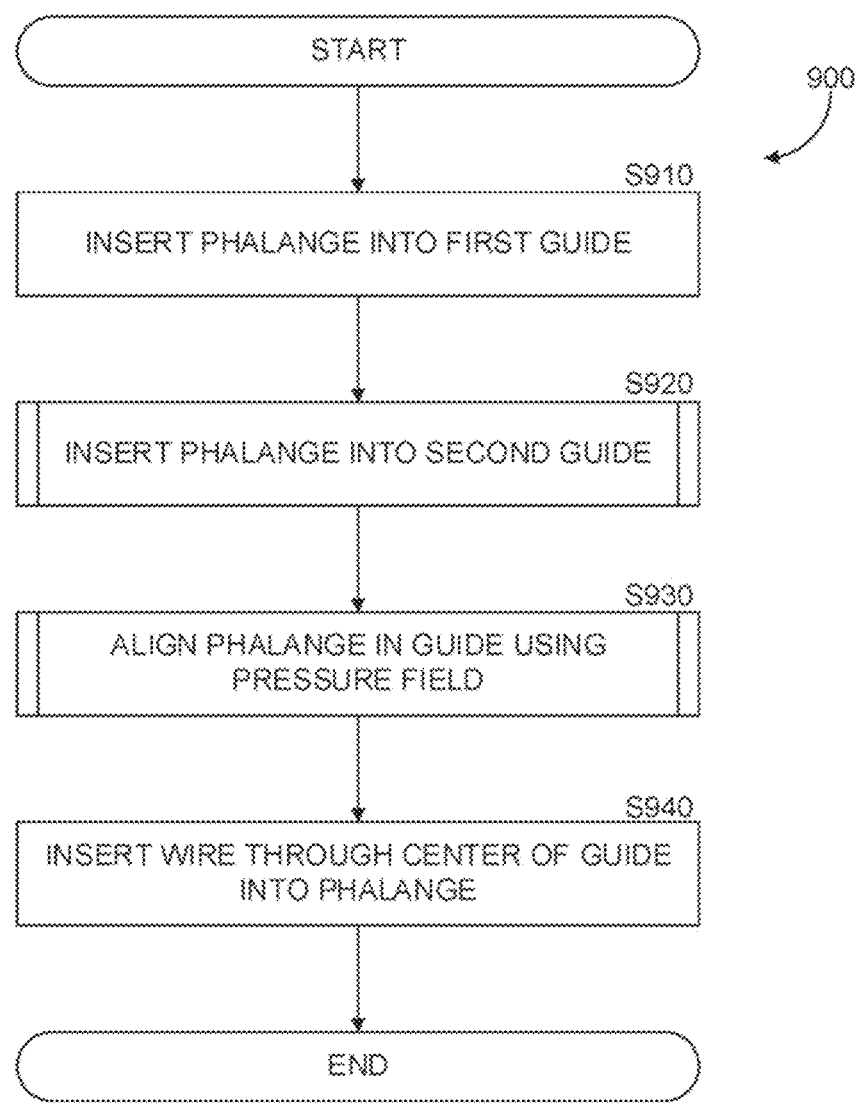
FIG. 9 is a flowchart 900 of a method for performing a k-wire fixation in a phalange using a centered guide, in accordance with an application of the present invention.

FIG. 9 is an example flowchart 900 of a method for performing a k-wire fixation of a fractured phalange using a centered guide, implemented in accordance with an application of the present invention. The method of FIG. 9 may be performed using any of the guide devices described herein, mutatis mutandis. Optionally, all or a portion of the elements of the multi-part k-wire guide device are assembled by one or more healthcare workers prior to or during the fixation procedure.

At a step S910, a fractured phalange is inserted into a first guide. The first guide includes a pin guide as described in more detail above, through which a k-wire may be inserted. The pin guide is typically concentric to an aperture of the first guide. In certain configurations the distal phalanx is inserted into the aperture of the first guide and held in place such that the lateral midpoint of the distal tip of the fractured phalange is substantially aligned with the center of the aperture, which in turn is concentric to the pin guide, thus ensuring that the k-wire does not slip when inserted into the distal phalanx. In some configurations the distal phalanx may be held in place by a friction fit created by an inflating member which surrounds at least a first and second portion of the distal phalange. The first guide may be a distal part, such as described in more detail above.

At an optional step S920, the fractured phalange is inserted into a second guide. When using a second guide, the fractured phalange is inserted first into the second guide, and then into the first guide. For example, a proximal part may be a second guide, and a distal part may be a first guide. In certain configurations, a plurality of second guides may be used, as needed, in order to provide additional support. The second guide includes an aperture through which the fractured phalange may be inserted, and a plurality of guide perforations, which may each accept a guiding rod, to affix the first guide and the second guide to the guiding rod.

At an optional step S930, the fractured phalange may be aligned in a guide using a pressure field. In a configuration the first guide, second guide, or both, may include a pressure field. A pressure field may be generated, for example by an inflating member which applies pressure between an internal surface of the guide and the fractured phalange portion which is inserted therethrough. In a configuration, each guide may include one or more inflating members, each inflating member controlled by a pressure supply which may supply positive or negative pressure in order to align the fractured phalange. In certain configurations the fractured phalange should be aligned to the center of a circular aperture of each guide, which in turn are concentric with the pin guide.

At a step S940, a k-wire is inserted through the pin guide. Inserting the wire through a pin guide ensures that the k-wire does not slip and passes through the distal phalanx in a manner which provides proper alignment. The pin guide is placed such that an opening of the pin guide is substantially aligned with the lateral midpoint of the distal tip of the fractured phalange. In a configuration, the pin guide opening is further concentric to the aperture of the first guide, the second, or both.

Typically, the guide device is removed from the fractured phalange by the healthcare worker(s) soon after fixating the fractured phalange by inserting the k-wire(s), such as within 5 minutes of fixating, e.g., within one minute of fixating.

Typically, the k-wire is inserted into the fractured phalange without first drilling into the fractured phalange use a drill bit separate from the k-wire.

Typically, fixating the fractured phalange does not comprise inserting into the fractured phalange an intramedullary device other than the k-wire.

Figure 10A:
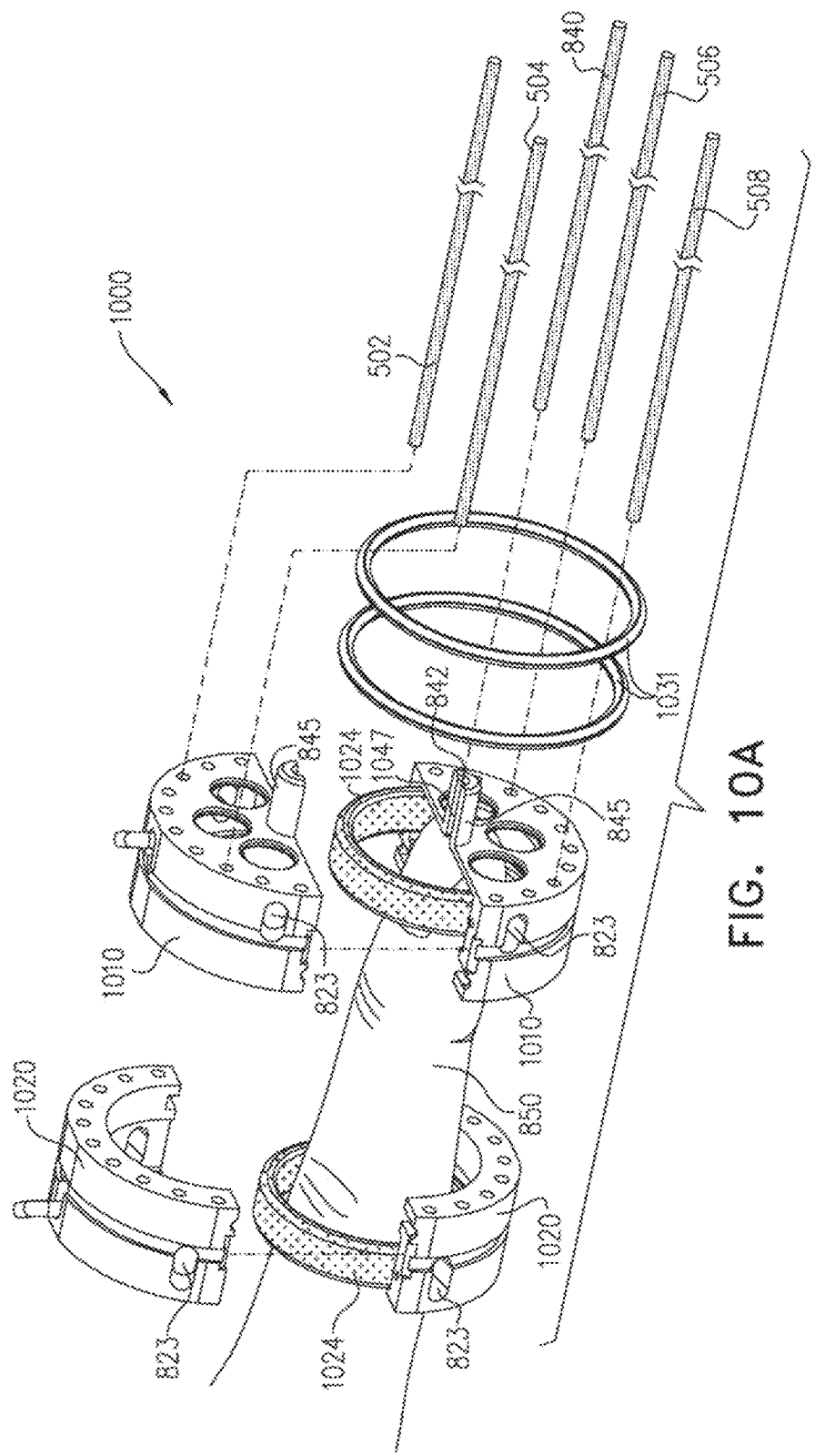
FIGS. 10A-B are schematic illustrations of a side view of a multi-part k-wire guide device, implemented in accordance with an application of the present invention.
Figure 10B:
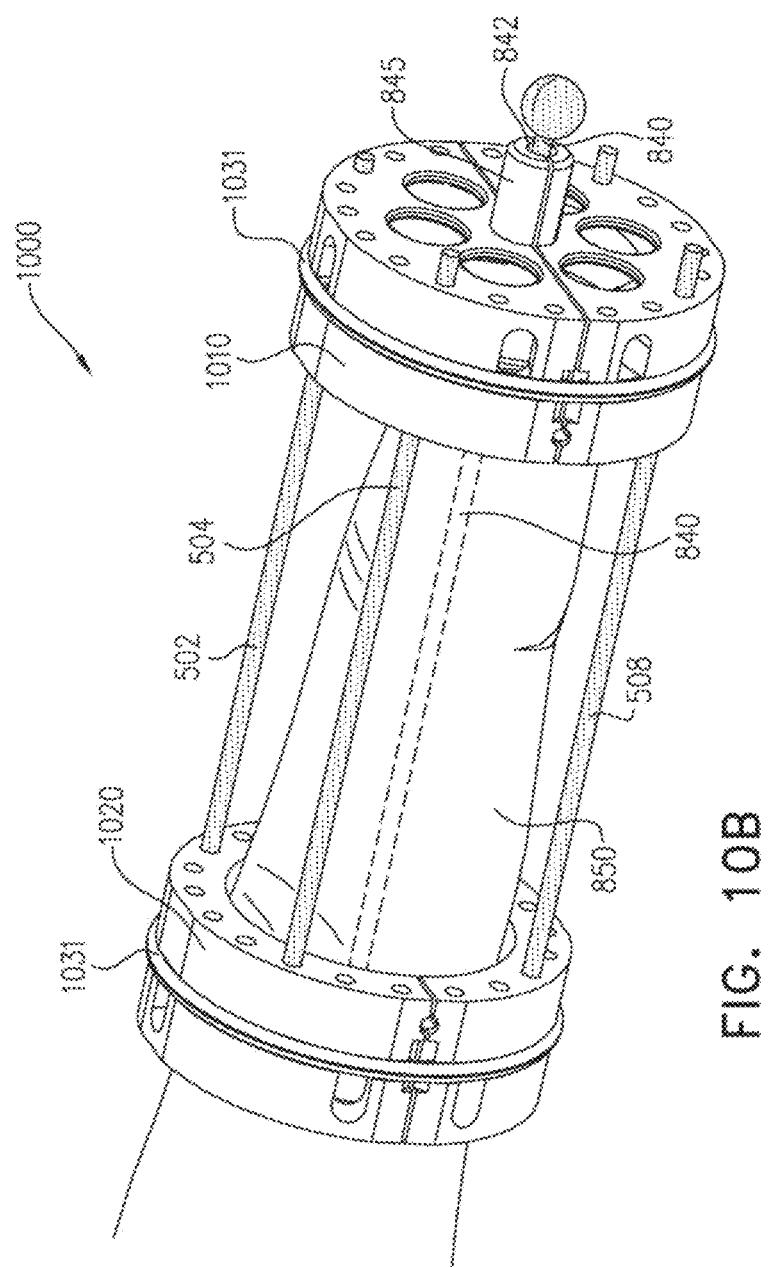

FIGS. 10A-B are schematic illustrations 1000 of a side view of a multi-part k-wire guide device, implemented in accordance with an application of the present invention. Other than as shown and described hereinbelow, this multi-part k-wire guide device is generally similar to the multi-part k-wire guide device described hereinabove with reference to FIG. 8B, and may implement any features thereof and/or of the other multi-part k-wire guide devices described herein, mutatis mutandis. Similarly, the multi-part k-wire guide devices described herein may implement any of the features described with reference to FIGS. 10A-B, mutatis mutandis. Like reference numerals refer to like parts.

The multi-part k-wire guide device includes a distal part 1010 and, typically, at least a proximal part 1020. In a configuration, a plurality of proximal parts may be used, spread across a fractured phalange 850. The proximal part 820 is placed such that the fractured phalange 850 extends through an aperture of the proximal part 1020. The proximal part 1020 may reside at the middle phalanx, proximal phalanx, and both, for example when using a plurality of proximal parts. The proximal part 1020 includes a plurality of guide perforations, such as described hereinabove.

The distal part 1010 is placed at the distal phalanx. The distal part 1010 includes the pin guide 845, which typically is fixedly connected to the distal end of the distal part 1010. The pin guide 845 is shaped so as to define an elongate cylindrical guide passage 1047 therethrough. A k-wire 840 may inserted into the pin guide 845 via the distal opening 842 of the elongate cylindrical guide passage 1047. The elongate cylindrical guide passage 1047 of the pin guide 845 is configured to align the k-wire 840 with the portion of the fractured phalange 850 during the insertion of the k-wire into the portion of the fractured phalange 850 while the portion of the fractured phalange 850 is held in place within the tubular section of the distal part 1010.

The distal part 1010 may further include a plurality of guide perforations, such as described hereinabove for distal part 810 with reference to FIGS. 8A-B.

In some configurations, one or both of the proximal part 1020 and the distal part 1010 include a plurality of channels, such as a first channel 823 and/or a second channel 824, such as described hereinabove for distal part 810 with reference to FIG. 8B. In these configurations, the multi-part k-wire guide device of FIGS. 10A-B may or may not comprise the pin guide 845. In configurations in which the multi-part k-wire guide device comprises the pin guide 845, the physician performing the method may or may not opt to insert a k-wire 840 using the pin guide 845; in the latter case, the physician uses the multi-part k-wire guide device only for inserted one or more k-wires by one or more respective lateral approaches.

Figure 11A:
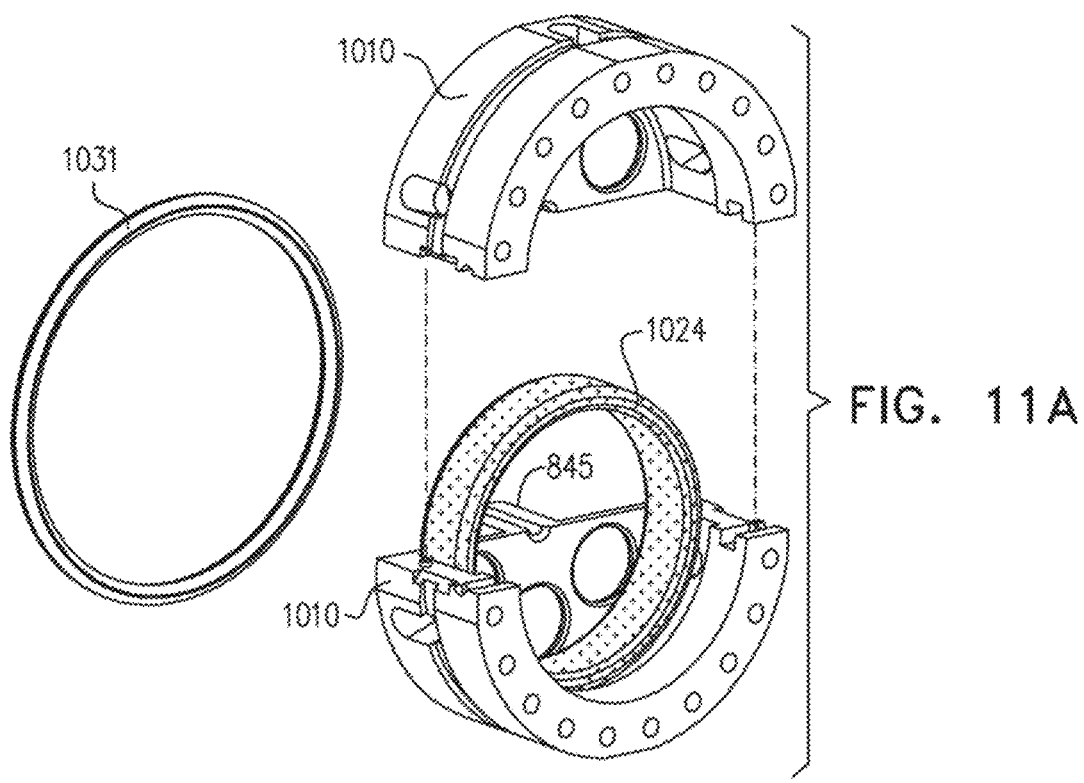
FIGS. 11A-C are schematic illustrations of a side view of a configuration of a distal part of the multi-part k-wire guide device of FIGS. 10A-B, implemented in accordance with an application of the present invention.
Figure 11B:
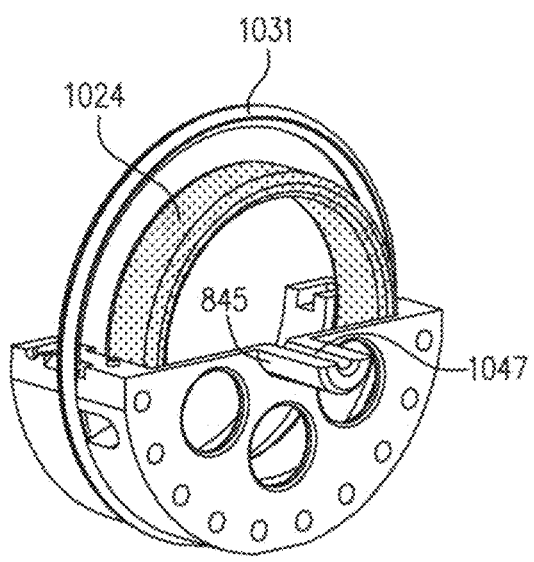
Figure 11C:
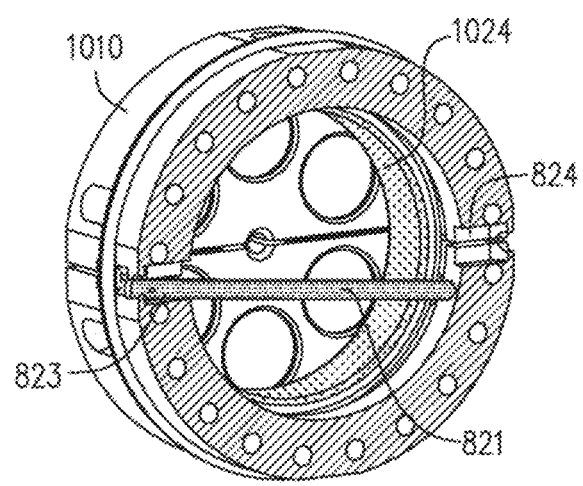

FIGS. 11A-C are schematic illustrations of a side view of a configuration of the distal part 1010, implemented in accordance with an application of the present invention. The configuration shown in FIGS. 11A-C for the distal part 1010 may also be implemented for the proximal part 1020, mutatis mutandis. In this configuration, the distal part 1010 comprises two partial rings that are assembled together on the fractured phalange 850 during a fixation procedure, in order to form the distal part 1010. Optionally, the two partial rings are held together by a flexible ring 1031, e.g., comprising rubber or silicone rubber. Optionally, the two partial rings comprise respective portions of pin guide 845, such as shown.

Figure 12A:
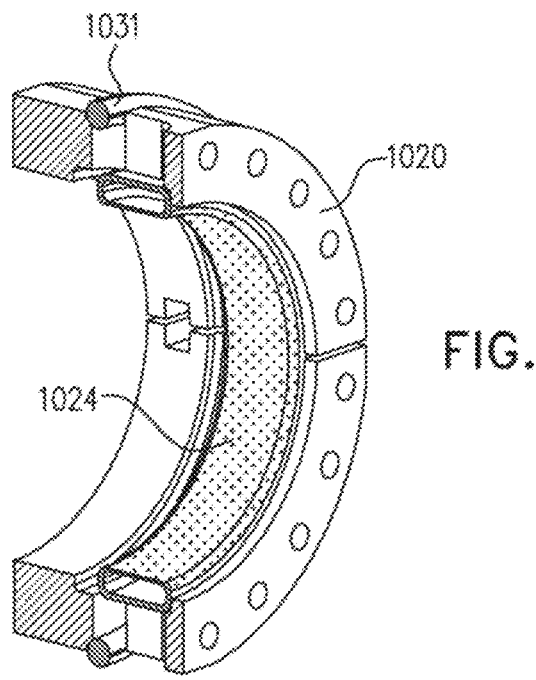
FIGS. 12A-B are schematic cross-sectional illustrations of a configuration of the proximal part of the multi-part k-wire guide device of FIGS. 10A-B, implemented in accordance with an application of the present invention.
Figure 12B:
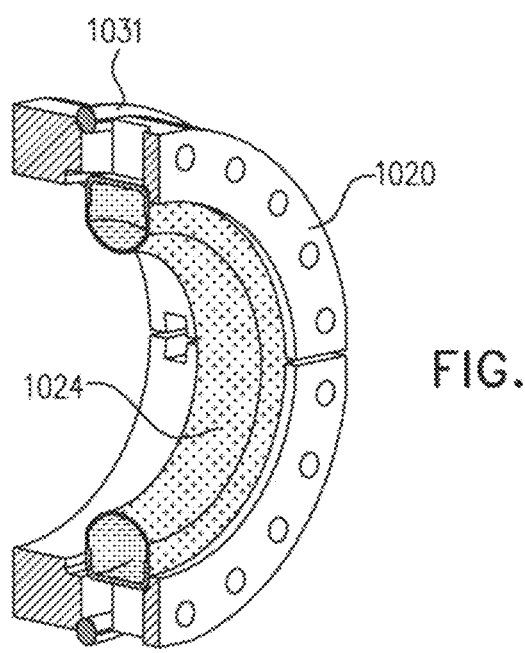

FIGS. 12A-B are schematic cross-sectional illustrations of a configuration of the proximal part 1020, implemented in accordance with an application of the present invention. The configuration shown in FIGS. 12A-B for the proximal part 1020 may also be implemented for the distal part 1010, mutatis mutandis. In this configuration, an inflatable member 1024 is coupled to an internal surface of the aperture of the proximal part 1020. The inflatable member 1024 may optionally implement any of the features the inflatable member 724 described hereinabove with reference to FIG. 7A and/or FIG. 7B. FIGS. 12A and 12B show the inflatable member 1024 uninflated and inflated, respectively.

Figure 13A:
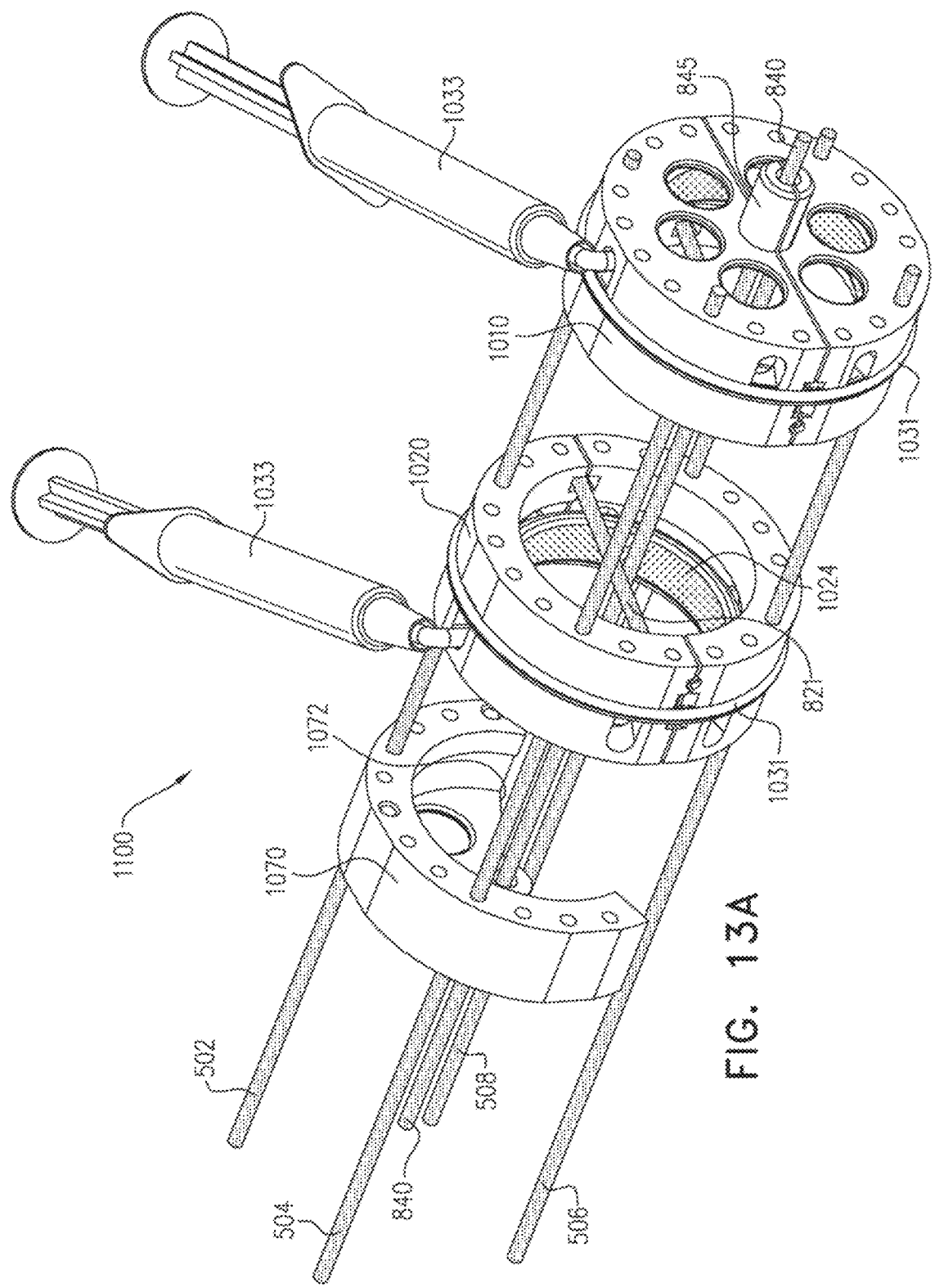
FIGS. 13A-B are schematic illustrations of a side view of another multi-part k-wire guide device in a proximal fixation, implemented in accordance with yet another application of the present invention.
Figure 13B:
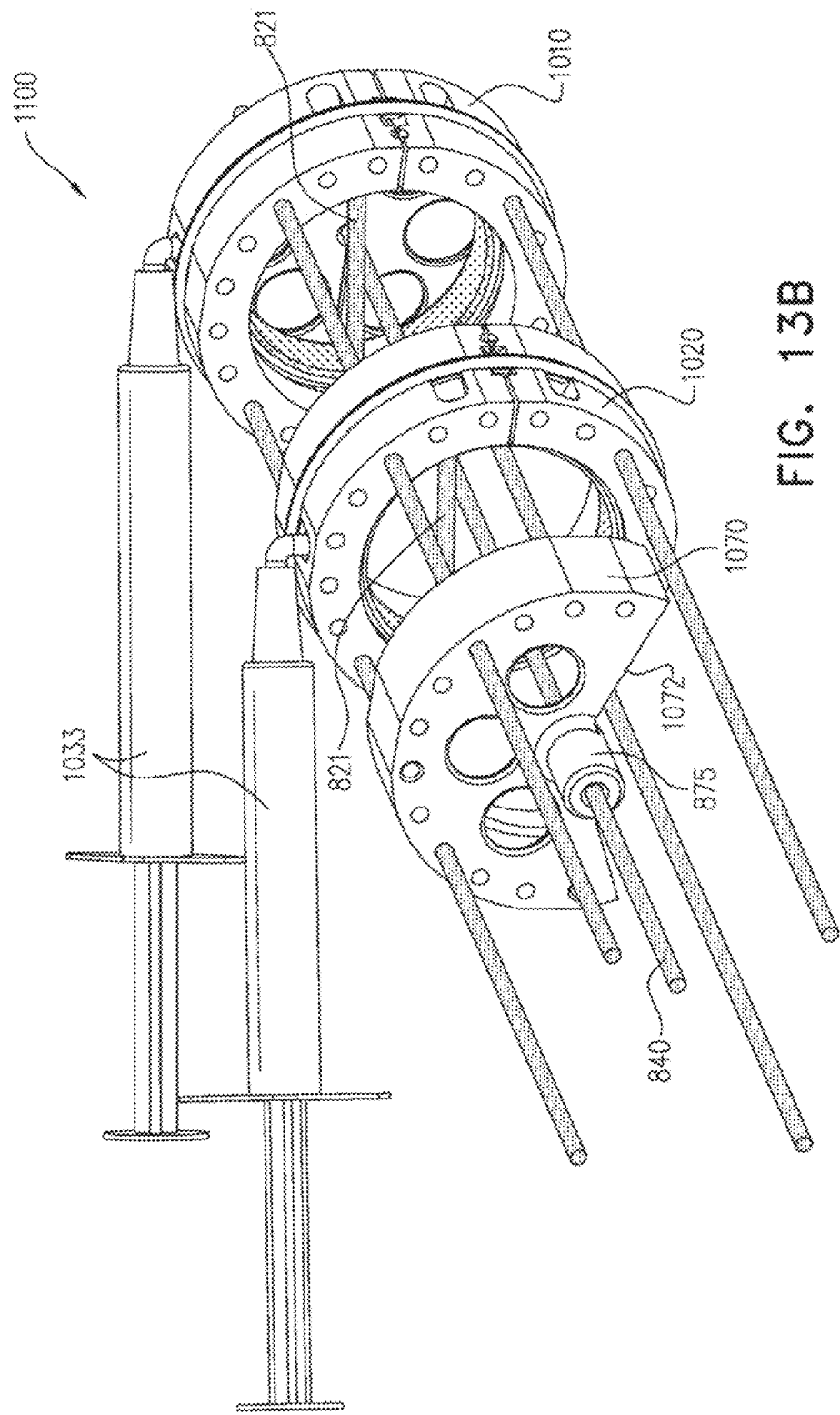

FIGS. 13A-B are schematic illustrations 1100 of a side view of a multi-part k-wire guide device in a proximal fixation, implemented in accordance with yet another application of the present invention.

Figure 14:
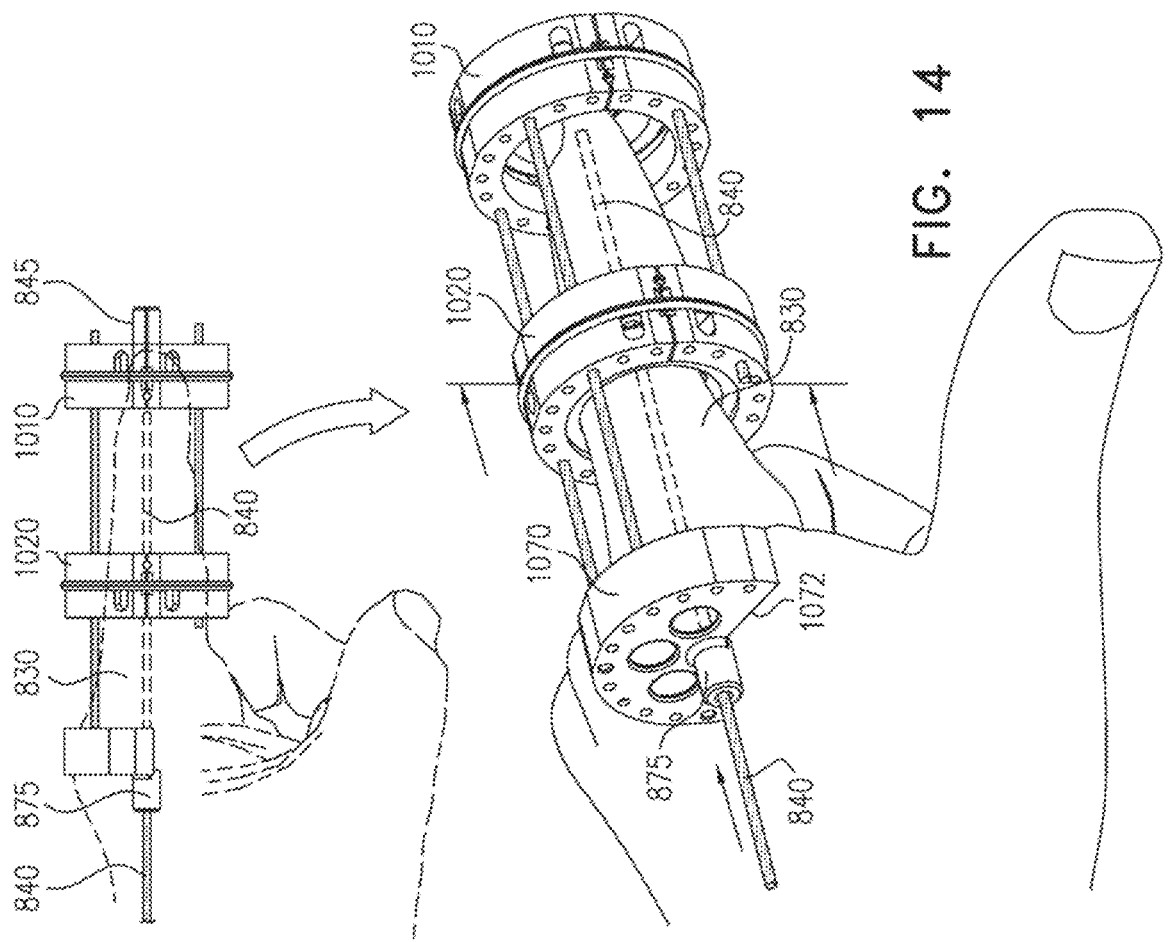
FIG. 14 is a schematic illustration of the multi-part k-wire guide device of the schematic illustrations of FIGS. 13A-B in a proximal fixation, implemented in accordance with an application of the present invention.

FIG. 14 is a schematic illustration of the multi-part k-wire guide device of the schematic illustrations 1100 of FIGS. 13A-B in a proximal fixation, implemented in accordance with an application of the present invention.

Figure 15A:
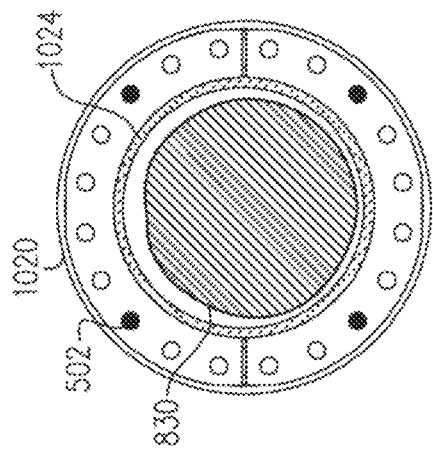
FIGS. 15A-B are schematic cross-sectional illustrations of the multi-part k-wire guide device of the schematic illustrations of FIG. 14 in the proximal fixation, implemented in accordance with an application of the present invention.
Figure 15B:
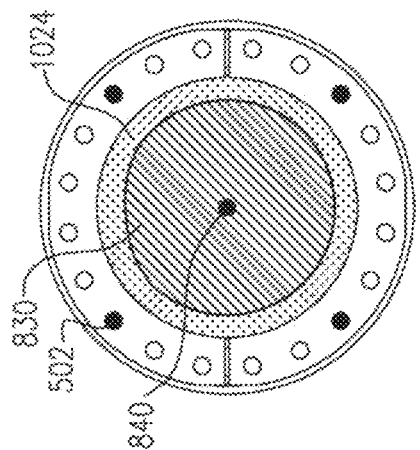

FIGS. 15A-B are schematic cross-sectional illustrations of the multi-part k-wire guide device of the schematic illustrations 1100 of FIG. 14 in the proximal fixation, implemented in accordance with an application of the present invention.

Other than as shown and described hereinbelow, the multi-part k-wire guide device shown in FIGS. 13A-B. 14, and 15A-B is generally similar to the multi-part k-wire guide device described hereinabove with reference to FIG. 8C, and may implement any features thereof and/or of the other multi-part k-wire guide devices described herein, mutatis mutandis. Similarly, the multi-part k-wire guide devices described herein may implement any of the features described with reference to FIGS. 13A-B, 14, and 15A-B, mutatis mutandis. Like reference numerals refer to like parts.

The multi-part k-wire guide device includes a distal part 1010, which comprises pin guide 845. In some configurations, the distal part 1010 may be implemented without the pin guide 845. This may be beneficial in order to hold in place (i.e., stabilize) a proximal guide 1070, which is placed in proximity of the MCP joint. The proximal guide 1070 is typically separate from and coupled to the distal part 1010, such as using one or more rods, as described herein.

The distal part 1010 may be affixed to one or more guiding rods, such as described hereinabove. The proximal guide 1070 comprises the pin guide 875, which is described hereinabove with reference to FIG. 8C. In a configuration, one or more k-wires may be inserted through the pin guide 875. In certain configurations, the proximal guide 1070 may include a plurality of pin guides. In some configurations, a pin guide is centered relative to the MCP joint. A k-wire 840 may be placed through the pin guide 875, and inserted through the MCP joint, and be further inserted at least into the proximal phalanx.

In certain configurations, the proximal guide 1070 may include an indent 1072 at a bottom portion (i.e., a portion which is closer to the wrist) in order to accommodate the structure of the MCP joint area. Alternatively or additionally, the proximal guide 1070 may be shaped so as to define a partial ring. As with the distal guides described above, the proximal guide 1070 may include a cushion in order to generate pressure on the fractured phalange and increase friction to prevent movement of the fractured phalange in the proximal guide. In some configurations, a distal guide such as described above can be utilized as a proximal guide 870 for performing a proximal fixation.

In some configurations, the multi-part k-wire guide device shown in FIGS. 13A-B, 14, and 15A-B further comprises the proximal part 1020 described hereinabove with reference to FIGS. 10A-B. The proximal guide 1070 is disposed proximal to the proximal part 1020. The proximal part 1020 is typically separate from and coupled to the distal part 1010 and to the proximal guide 1070, such as using one or more rods, as described herein.

By way of example and not limitation, a pressure supply 1033 is shown as comprising a syringe in FIGS. 13A-B. This is one exemplary implementation of the pressure supply described hereinabove with reference to FIGS. 4, 5, and 7A-B.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

In an embodiment, techniques and apparatus described in U.S. application Ser. No. 17/652,424, filed Feb. 24, 2022, now U.S. Pat. No. 11,666,361, are combined with techniques and apparatus described herein.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A guide device for fixation of a fractured phalange by insertion of a k-wire, the guide device comprising:
   a proximal part, which is shaped so as to define therethrough an aperture, and which comprises a first cushion within the aperture, which is configured to hold the fractured phalange in place after insertion of the fractured phalange through the aperture;
   a distal part, which (a) is shaped so as to define (i) an opening of a first diameter at a proximal end of the distal part and (ii) a tubular section, and (b) comprises a second cushion within the tubular section, the second cushion configured to hold a portion of the fractured phalange in place after insertion of the portion of the fractured phalange into the tubular section; and
   a pin guide connected to and extending distally from the distal part, the pin guide having a second diameter which is less than the first diameter,
   wherein the pin guide is shaped so as to define an elongate guide passage therethrough that is configured to align the k-wire with the portion of the fractured phalange during the insertion of the k-wire into the portion of the fractured phalange while the fractured phalange is held in place within the aperture of the proximal part and the tubular section of the distal part.

2. The guide device according to claim 1, wherein the first and the second cushions are annular.

3. The guide device according to claim 1, further comprising a plurality of rods, which couple the proximal part to the distal part and run alongside a portion of the fractured phalange disposed between the proximal part and the distal part when the fractured phalange is inserted through the first cushion and partially into the second cushion.

4. The guide device according to claim 1, wherein the first and the second cushions comprise respective sponge cushions.

5. The guide device according to claim 1, wherein the first and the second cushions comprise respective inflatable cushions.

6. The guide device according to claim 5, wherein the distal part and the proximal part are shaped so as to define respective ducts through which the first and the second inflatable cushions are inflatable.

7. The guide device according to claim 1,
wherein the pin guide is a first pin guide and the elongate guide passage is a first elongate guide passage, and
wherein the guide device further comprises:
a proximal guide, which is separate from and coupled to the proximal part and the distal part, and which is configured to be placed against skin of a hand in proximity of a metacarpophalangeal (MCP) joint; and
a second pin guide connected to and extending proximally from the proximal guide, the second pin guide shaped so as to define a second elongate guide passage therethrough that is configured to align the k-wire with the fractured phalange during the insertion of the k-wire into the portion of the fractured phalange while the proximal guide is disposed against the skin of the hand in proximity of the MCP joint and the fractured phalange is held in place within the aperture of the proximal part and the tubular section of the distal part.

8. A kit comprising the guide device according to claim 1, the kit further comprising the k-wire.

9. A guide device for fixation of a fractured phalange by insertion of a k-wire having a diameter, the guide device comprising:
a distal part, shaped so as to define an opening of a first diameter at a proximal end of the distal part and a tubular section for inserting a portion of the fractured phalange;
a proximal guide, which is separate from and coupled to the distal part, and which is configured to be placed against skin of a hand in proximity of a metacarpophalangeal (MCP) joint;
a first pin guide connected to and extending distally from the distal part, the first pin guide having a second diameter which is less than the first diameter; and
a second pin guide connected to and extending proximally from the proximal guide,
wherein the first and the second pin guides are shaped so as to define respective elongate guide passages therethrough that are configured to align the k-wire with the portion of the fractured phalange during the insertion of the k-wire into the portion of the fractured phalange while the proximal guide is disposed against the skin of the hand in proximity of the MCP joint and the portion of the fractured phalange is held in place within the tubular section of the distal part.

10. The guide device according to claim 9, wherein the proximal guide is shaped so as to define a partial ring.

11. The guide device according to claim 9, further comprising a plurality of rods, which couple the proximal guide to the distal part and run alongside a portion of the fractured phalange disposed between the proximal guide and the distal part when the proximal guide is disposed against the skin of the hand in proximity of the MCP joint and the portion of the fractured phalange is held in place within the tubular section of the distal part.

12. A method for performing k-wire fixation of a fractured phalange, the method comprising:

inserting (a) the fractured phalange through a first cushion within an aperture defined through a proximal part of a guidewire device, and (b) a portion of the fractured phalange into a second cushion within a tubular section of a distal part of the guide device via an opening at a proximal end of the distal part, such that the first and the second cushions hold the fractured phalange in place, the distal part including a pin guide connected to and extending distally away from the distal part; and
fixating the fractured phalange by inserting a k-wire through an elongate guide passage of the pin guide and into the fractured phalange, while the elongate guide passage aligns the k-wire while the portion of the fractured phalange is held in place within the aperture of the proximal part and the tubular section of the distal part.

13. The method according to claim 12, wherein a plurality of rods couple the proximal part to the distal part and run alongside a portion of the fractured phalange disposed between the proximal part and the distal part when the fractured phalange is inserted through the first cushion and partially into the second cushion.

14. The method according to claim 12, further comprising aligning the fractured phalange in the proximal part and the distal part using pressure applied by the first and the second cushions.

15. The method according to claim 12, further comprising removing the guide device from the fractured phalange within 5 minutes after fixating the fractured phalange by inserting the k-wire.

16. The method according to claim 12, wherein fixating the fractured phalange by inserting the k-wire into the fractured phalange comprises fixating the fractured phalange by inserting the k-wire into the fractured phalange without first drilling into the fractured phalange using a drill bit separate from the k-wire.

17. The method according to claim 12, wherein the first and the second cushions are annular.

18. The method according to claim 12, wherein the first and the second cushions include respective sponge cushions.

19. The method according to claim 12, wherein the first and the second cushions include respective inflatable cushions.

20. The method according to claim 12,
wherein the pin guide is a first pin guide and the elongate guide passage is a first elongate guide passage,
wherein the method further comprises placing a proximal guide against skin of a hand in proximity of a metacarpophalangeal (MCP) joint, the proximal guide separate from and coupled to the proximal part and the distal part, and
wherein fixating the fractured phalange comprises inserting the k-wire through the elongate guide passage of the first pin guide and through a second elongate guide passage through a second pin guide connected to and extending proximally from the proximal guide, while the proximal guide is disposed against the skin of the hand in proximity of the MCP joint and the fractured phalange is held in place within the aperture of the proximal part and the tubular section of the distal part.

* * * * *